(12) United States Patent
Mitamura

(10) Patent No.: US 6,807,008 B2
(45) Date of Patent: Oct. 19, 2004

(54) WAVELENGTH DISPERSION GENERATION APPARATUS, MULTI-FACED MIRROR USED FOR WAVELENGTH DISPERSION GENERATION APPARATUS, AND METHOD FOR MANUFACTURING THEREOF

(75) Inventor: Nobuaki Mitamura, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 10/341,380

(22) Filed: Jan. 14, 2003

(65) Prior Publication Data

US 2004/0042082 A1 Mar. 4, 2004

(30) Foreign Application Priority Data

Aug. 27, 2002 (JP) ........................................ 2002-247153

(51) Int. Cl.⁷ .............................................. G02B 27/00
(52) U.S. Cl. .................. 359/577; 359/584; 359/589; 359/868; 359/884; 398/81; 398/147
(58) Field of Search ................................ 359/577–579, 359/631, 634, 584, 589, 868–869, 883–884, 81, 147, 149

(56) References Cited

U.S. PATENT DOCUMENTS

| | | | | |
|---|---|---|---|---|
| 5,710,668 A | * | 1/1998 | Gohman et al. | ............ 359/634 |
| 5,717,532 A | * | 2/1998 | Chiba et al. | ................. 359/868 |
| 5,838,849 A | | 11/1998 | Shirasaki | |
| 5,930,045 A | | 7/1999 | Shirasaki | |
| 5,969,865 A | * | 10/1999 | Shirasaki | ..................... 359/577 |
| 5,973,838 A | | 10/1999 | Shirasaki | |
| 5,982,488 A | | 11/1999 | Shirasaki | |
| 5,999,320 A | | 12/1999 | Shirasaki | |
| 6,028,706 A | | 2/2000 | Shirasaki et al. | |
| 6,144,494 A | | 11/2000 | Shirasaki et al. | |
| 6,169,630 B1 | | 1/2001 | Shirasaki et al. | |
| 6,185,040 B1 | | 2/2001 | Shirasaki et al. | |

FOREIGN PATENT DOCUMENTS

GB    1278081 A2 *  1/2003

* cited by examiner

Primary Examiner—Drew A. Dunn
Assistant Examiner—Leo Boutsikaris
(74) Attorney, Agent, or Firm—Staas & Halsey LLP

(57) ABSTRACT

A mirror which reflects input light from a lens which focuses light emitted from a VIPA, and returns the light to the lens is constituted as a multi-faced mirror including multiple reflection surfaces in the traveling direction of the input light which individually reflect light with a different wavelength, and have a different shape. As a result, an apparatus which has a small optical loss, and generates a different wavelength dispersion depending on a channel signal wavelength of a WDM signal.

26 Claims, 15 Drawing Sheets

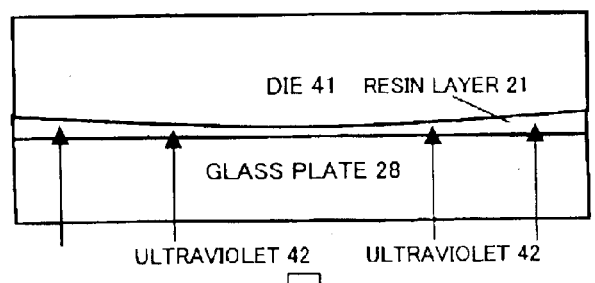
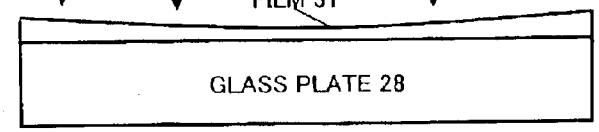
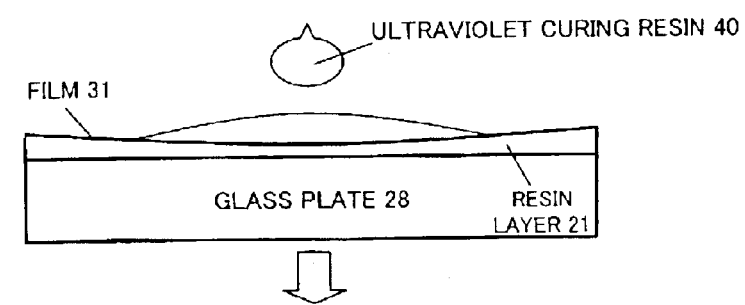
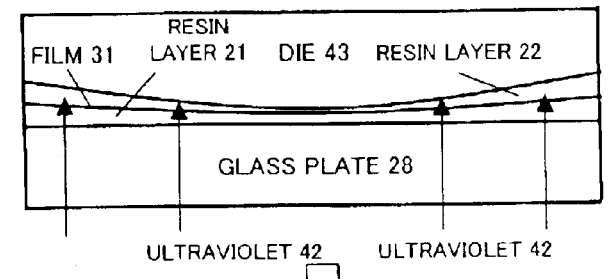
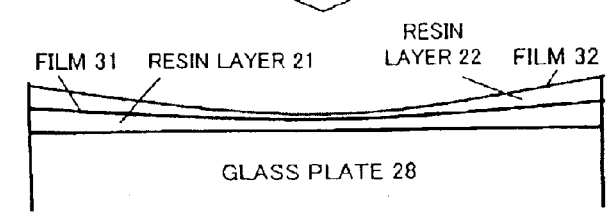

WAVELENGTH DISPERSION GENERATION APPARATUS, MULTI-FACED MIRROR USED FOR WAVELENGTH DISPERSION GENERATION APPARATUS, AND METHOD FOR MANUFACTURING THEREOF

BACKGROUND OF THE INVENTION (1) Filed of the Invention

The present invention relates to an apparatus which is intended to apply to a wavelength division multiplex transmission apparatus, generates a dispersion different from one another according to a channel signal wavelength, and compensates a wavelength dispersion slope accumulated on an optical fiber transmission network.

(2) Description of Related Art

A light transmitter transmits a light pulse to a light receiver over an optical fiber in a conventional optical fiber communication system which transmits information using light. However, the wavelength dispersion of the optical fiber, which is also referred to as a "chromatic dispersion," degrades the quality of a signal in the system.

More specifically, as a result of the wavelength dispersion, the propagation velocity of signal light in the optical fiber depends on the wavelength of the signal light in the optical fiber. For example, when a light pulse with a longer wavelength (such as a light pulse presenting red) propagates faster than a light pulse with a shorter wavelength (such as a light pulse presenting blue), its dispersion is referred to as a normal dispersion. On the other hand, when a light pulse with a shorter wavelength (such as a blue pulse) propagates faster than a light pulse with a longer wavelength (such as a red pulse), its dispersion is referred to as an abnormal dispersion.

Thus, if a signal light pulse includes a red pulse and a blue pulse when the signal light pulse is transmitted from a transmitter, the red pulse and the blue pulse are split from each other as the signal light pulse propagates over an optical fiber, and the individual light pulses are received by a receiver at different moments.

As another example of the light pulse transmission, when a signal light pulse having wavelength components continuously changing from blue to red is transmitted, since the individual components propagate at different speeds in an optical fiber, the width in time of the signal light pulse increases in the optical fiber, and a distortion is generated. Since any pulse includes components within a finite wavelength range, the generation of this wavelength dispersion is extremely general in the optical fiber communication system.

Thus, it is necessary to compensate the wavelength dispersion so as to obtain high transmission capability especially in a high speed optical fiber communication system. Consequently, a "reverse dispersion component" which adds a wavelength dispersion opposite to the wavelength dispersion generated in the optical fiber is necessary in the optical fiber communication system.

Some conventional apparatuses may be used as this "reverse dispersion component". For example, a dispersion compensation fiber (DCF) has a specific cross section refractive index profile, provides a wavelength dispersion opposite to one generated in the conventional transmission line, and is used as the "reverse dispersion component".

However, it costs high to manufacture the dispersion compensation fiber, and simultaneously, a relatively longer fiber is necessary for sufficiently compensating the wavelength dispersion generated in the transmission line. For example, a dispersion compensation fiber with a length of about 20 km to 30 km is necessary for completely compensating a wavelength dispersion generated in a transmission line of 100 km. Thus, the optical loss increases, and simultaneously the size increases.

A chirped fiber grating is used as the "reverse dispersion component" for compensating the wavelength dispersion as well. The fiber grating uses a phenomenon where the refractive index of germanium oxide used for doping the core changes as a result of ultraviolet irradiation, and forms a grating which changes the refractive index at a cycle of a half of a wavelength, and a longer wavelength component is reflected through a longer distance so as to propagate a distance longer than that of a shorter wavelength component as a result of gradually changing the interval of the grating in the lengthwise direction of the fiber. Thus, the chirped fiber grating also provides a light pulse with a reverse dispersion.

However, since the chirped fiber grating has a very narrow range in terms of the light to be reflected, it is impossible to provide a sufficient range for light including many wavelengths such as a wavelength division multiplex transmission signal. Though it is possible to cascade multiple chirped fiber gratings for a wavelength division multiplex transmission signal, the system becomes expensive.

In view of these conventional apparatuses, Published Japanese Translation of a PCT Application 2000-511655 (Japanese Unexamined Patent Application Publication HEI10-534450) and Published Japanese Translation of a PCT Application 2002-514323 (Japanese Unexamined Patent Application Publication HEI11-513133) propose an optical apparatus including a device called as a virtually imaged phased array (VIPA), for example.

This VIPA is a device which receives light having a respective wavelength within a continuous range of wavelengths, and generates output light continuously corresponding to the input light, and comprises parallel flat plates placed such that two reflection surfaces oppose to each other at a predetermined interval, the one reflection surface has light reflectance of 100%, and the other reflection surface has light reflectance smaller than 100% (about 98%) as disclosed in Japanese Patent Application Publication HEI 9-43057, for example.

A light incident window (a transparent area) for introducing light from the outside is provided on a part of the reflection surface with reflectance of 100%, and when light having a respective wavelength within a continuous range of wavelengths is obliquely introduced into the VIPA (between the parallel flat plates) from this light incident window, reflection is repeated between the parallel flat plates, and a partial light is released continuously from the multiple positions on the reflection surface with reflectance smaller than 100% to the outside of the VIPA.

Since the transmission light released at the multiple positions from the VIPA in this way travels while spreading radially at a certain angle, interference of light having a large number of different travel directions for the same wavelength occurs. Thus, only a component with a specific traveling direction depending on the wavelength is enhanced, light flux is formed, and consequently, it is possible to provide light having a respective wavelength within a certain continuous range of wavelengths toward directions different from one wavelength to another (namely, it is possible to provide the output light with an angle dispersion). In other words, the output light of the VIPA is spatially discriminated from one another having a different wavelength within the continuous range of wavelengths of the input light.

The technology described in Published Japanese Translation of a PCT Application 2000-511655 and Published Japanese Translation of a PCT Application 2002-514323 relates to technology using the characteristic of the VIPA so as to generate a wavelength dispersion. Specifically, the technology relates to an optical apparatus (a wavelength dispersion generating apparatus) constituted to return the light provided from the VIPA to the VIPA, and to generate the multiple reflection again in the VIPA.

Namely, this optical apparatus comprises a collimating lens 100, a cylindrical lens 200, a VIPA 300, a focusing lens 400, and a mirror 500 as shown in FIG. 18, input light from an optical fiber 600 is collimated by the collimating lens 100, the cylindrical lens focuses only one way of the light wave, the light enters into the VIPA 300 through a light incident window 301, the focusing lens 400 focuses (condenses) output light from the VIPA, the mirror 500 reflects the light, and the light is introduced into the VIPA 300 again.

The VIPA 300 and the focusing lens 400 are positioned such that the light proceeding from the VIPA 300 to the focusing lens 400 is parallel with and opposite to the light returning from the focusing lens 400 to the VIPA 300. The light proceeding from the VIPA 300 to the focusing lens 400 does not overlap the light returning from the focusing lens 400 to the VIPA 300.

Since the output light from the VIPA 300 is provided in different directions according to the wavelength in the optical apparatus constituted as described above, the focusing lens 400 focuses different wavelength components of the light at different positions on the mirror 500 (FIG. 18 shows a state where the light with a shorter wavelength is focused at a top part of the mirror 500, and the light with a longer wavelength is focused at a bottom part of the mirror 500). Thus, light with a different wavelength propagates to the VIPA 300 through an optical path with a different distance, and thus, a certain wavelength dispersion is generated.

Since the VIPA 300 actually provides multiple beams with the same wavelength and different interference orders (since the light beams with a different interference order are provided in a different direction), the focusing lens 400 focuses only light with a specific interference order on the mirror 500, and the mirror 500 is designed so as to reflect the only light with the specific interference order. The light returned to the VIPA 300 passes through the surface with the reflectance lower than 100%, is introduced into the VIPA 300, is reflected multiple times in the VIPA 300 again, and is provided from the light incident window 301 of the VIPA 300 through a path the same as the input path.

As described above, the VIPA 300 has a function of an angle dispersion as a diffraction grating does, generates a wavelength dispersion so as to compensate the wavelength dispersion, specifically has an especially large angle dispersion, and easily provides a practical reverse dispersion component.

However, there exist the following additional needs as the practical reverse dispersion component used for a wavelength division multiplex transmission system.

Namely, a wavelength dispersion of a general optical fiber for a practical application is not constant depending on the wavelength as shown in FIG. 19, for example, and often has a slight positive slope (the wavelength dispersion increases toward the positive direction as the wavelength becomes longer). This slope of the wavelength dispersion may be referred to as a wavelength dispersion slope or a second order wavelength dispersion.

For example, while a general single mode fiber (SMF) has a wavelength dispersion of +16.79 ps/nm/km for 1 km (see a broken line 700), a wavelength dispersion slope for 1 km is +0.057 ps/nm2/km, and a change of the wavelength dispersion is about +2 ps/nm$^2$/km when a required range of wavelengths is 35 nm.

A solid line 800 and a broken line 900 indicate typical wavelength dispersion slopes of NZ-DSFs (non-zero dispersion shift optical fibers) in FIG. 19, and the solid line 800 and the broken line 900 respectively indicate Enhanced-LEAF (registered trademark) fiber (manufactured by Corning, abbreviated as E-LEAF hereafter), and TrueWave (registered trademark)-RS fiber (manufactured by Lucent, abbreviated as TW-RS hereafter).

The wavelength dispersion slope is not always positive (the wavelength dispersion increases toward the positive direction as the wavelength becomes longer), and changing the structural dispersion of a fiber may realize a negative dispersion slope.

Though the chart in FIG. 19 does not actually show straight lines, and the slopes of the wavelength dispersion (the wavelength dispersion slopes) are not constant in the strict sense, these third-order wavelength dispersions do not cause a problem at a transmission rate of about 40 Gb/s, and are negligible. In this way, it is desirable to provide a wavelength dispersion slope, namely a wavelength dispersion different depending on a channel signal wavelength, in addition to a wavelength dispersion as a practical reverse dispersion component.

A method of combining a VIPA and a branching filter such as a diffraction grating having a dispersion direction practically orthogonal to the dispersion direction of the VIPA as disclosed in "Compensation of chromatic dispersion and dispersion slope using a virtually imaged phased array", (M. Shirasaki, OFC2001) or a specification disclosed in U.S. Pat. No. 6,343,866 is applicable as a method for generating a wavelength dispersion slope opposite to that of an optical fiber so as to compensate the wavelength dispersion. However, since a theoretical grating effect is hardly obtained in the diffraction grating due to a problem in a manufacturing process, there is such a problem that the loss of light is large.

SUMMARY OF THE INVENTION

The present invention is devised in view of these problems, and has a purpose of providing wavelength dispersion generation apparatus having a low optical loss and providing different wavelength dispersions depending on a channel signal wavelength, a multi-faced mirror used for the wavelength dispersion generation apparatus, and a manufacturing method for this mirror.

To attain the purpose above, the wavelength dispersion generation apparatus of the present invention comprises a virtual imaged phased array (abbreviated as VIPA hereafter) generator which receives input light having a respective wavelength within a continuous range of wavelengths and causes multiple reflection of the input light that splits the input light into a plurality of light beams which produce self-interference of the input light that forms an output light while the output light is spatially distinguishable from an output light formed on input light having any other wavelength within the continuous range of wavelengths, a lens which focuses the output light emitted from the VIPA, and a mirror which reflects the input light from the lens so as to return the light to the lens, where the mirror is constituted by a multi-faced mirror including multiple reflection surfaces in the traveling direction of the input light from the lens, and the reflection surfaces individually reflect the light with a different wavelength, and simultaneously individually have a different shape.

It is preferable that the reflection surfaces individually have a curved surface shape with a different curvature in the traveling direction of the input light from the lens, and the reflection surfaces are individually constituted by an optical film filter having a different transmission wavelength characteristic and a different reflection wavelength characteristic.

A multi-faced mirror used for the wavelength dispersion generation apparatus of the present invention is used for a wavelength dispersion generation apparatus for generating a wavelength dispersion, and reflecting input light having a respective wavelength within a continuous range of wavelengths, and comprises multiple reflection surfaces in the traveling direction of the input light, and the reflection surfaces individually reflect the light with a different wavelength, and simultaneously individually have a different shape.

With the present invention, since light with a different wavelength is reflected on the reflection surface with the different shape, an optical path difference depending on the wavelength is provided so as to generate the wavelength dispersion, and simultaneously, an apparatus with an optical loss lower than that of a conventional apparatus is provided.

The multi-faced mirror is manufactured following the steps below, for example.

(1) A first step of applying first ultraviolet curing resin with a light transmission characteristic on a substrate.

(2) A second step of bring a first die having a first sectional shape into press-contact with the first ultraviolet curing resin, and irradiating ultraviolet to harden the first ultraviolet curing resin.

(3) A third step of separating the first die from the first ultraviolet curing resin.

(4) A fourth step of forming a first optical film filter serving as a first reflection surface having a first transmission wavelength and a first reflection wavelength on the first ultraviolet curing resin.

(5) A fifth step of applying second ultraviolet curing resin with a light transmission characteristic on the first optical film filter.

(6) A sixth step of bring a second die having a second sectional shape different from the first sectional shape into press-contact with the second ultraviolet curing resin, and irradiating ultraviolet to harden the second ultraviolet curing resin.

(7) A seventh step of separating the second die from the second ultraviolet curing resin.

(8) An eighth step of forming a second optical film filter serving as a second reflection surface having a second transmission wavelength and a second reflection wavelength respectively different from the first transmission wavelength and the second reflection wavelength on the second ultraviolet curing resin.

In this way, since the multi-faced mirror is manufactured by repeating the individual steps, which comprise applying the ultraviolet curing resin, bringing the die in press-contact, irradiating ultraviolet, separating the die, and forming the optical film filter, depending on the number of reflection surfaces required for the multi-faced mirrors, the multi-faced mirror is easily realized.

BRIEF DESCRIPTION OF THE DRAWINGS

FIG. 8A to FIG. 8F are schematic sectional views describing a manufacturing method of the multi-faced mirror shown in FIG. 4;

DESCRIPTION OF THE PREFERRED EMBODIMENTS

The following section describes embodiments of the present invention while referring to drawings.

(A) Description of Embodiment

Figure 1:
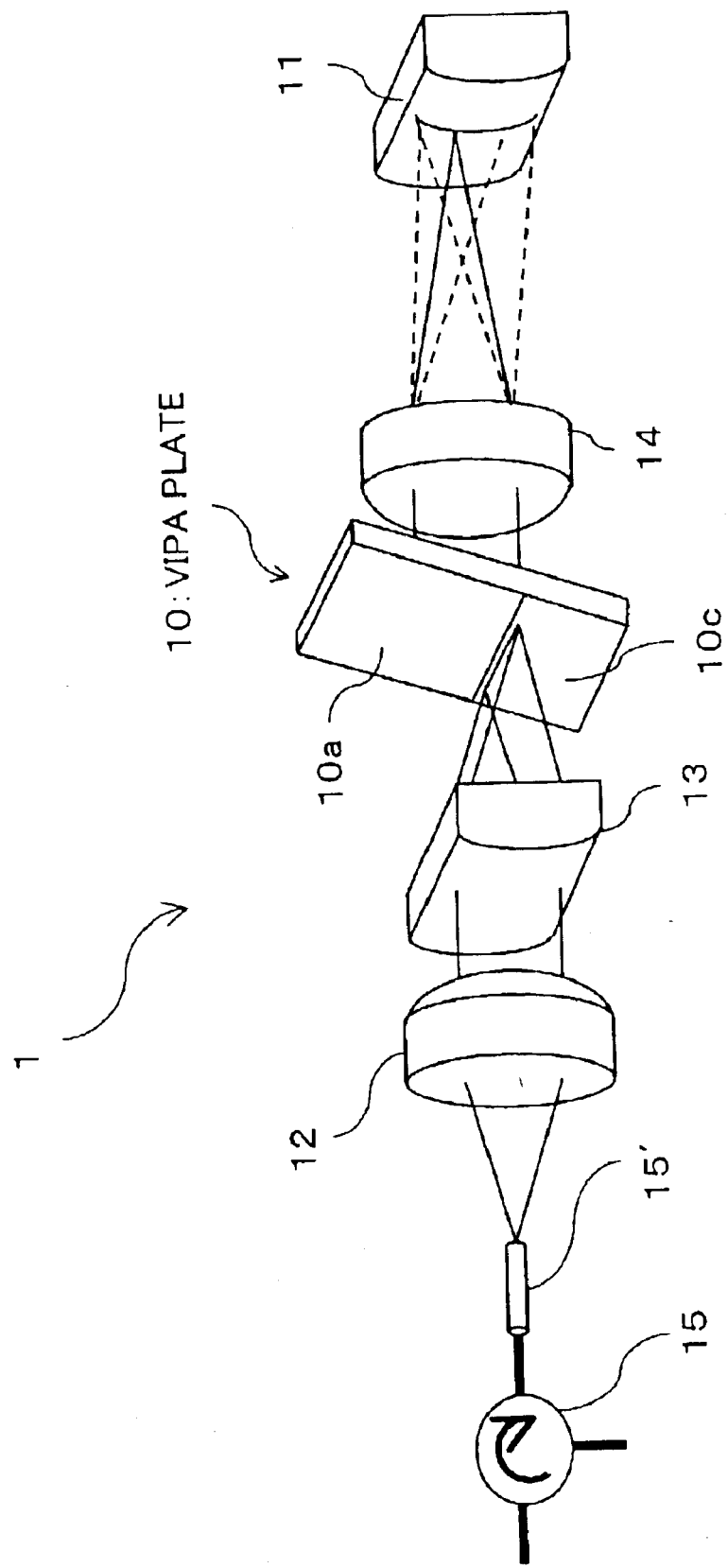
FIG. 1 is a schematic perspective view showing a constitution of a wavelength dispersion compensation apparatus (a wavelengths dispersion generation apparatus) using a virtual imaged phased array (VIPA) as an embodiment of the present invention.

FIG. 1 is a schematic perspective view showing a constitution of a wavelength dispersion compensation apparatus (a wavelengths dispersion generation apparatus) using a virtually imaged phased array (VIPA) as an embodiment of the present invention.

The wavelength compensation apparatus shown in FIG. 1 comprises a VIPA plate 10, a mirror 11, a collimating lens 12, a line-focusing lens (a cylindrical lens) 13, and a focusing lens 14. Numeral 15 shows an optical circulator, and numeral 15' shows an optical fiber.

The collimating lens 12 collimates a light coming out from the optical fiber 15' so as to provide it as collimated light, and the line-focusing lens 13 focuses the collimated light from the collimating lens 12 only in one direction (focuses as a line).

The VIPA plate 10 receives the light provided from the line-focusing lens 13 as input light, reflects the input light multiple times so as to interfere with itself, and then to dispersingly provide output light having a dispersion direction as a virtually straight line and an output angle depending on the wavelength as in prior art, and the focusing lens 14 focuses the light (as a point) provided from the VIPA plate 10.

Thus, though the VIPA plate 10 comprises two parallel plates having a reflection surface provided at a predetermined interval, it is actually realized by forming (coating) a reflection film 10a with reflectance of about 100% on one surface (an input surface), and a reflection film 10b with reflectance of about 98% on the other surface (an output surface) on a glass plate with a predetermined thickness.

Also, an anti-reflection film 10c (reflectance of 0%) is formed (coated) at a lower part (an input position of the light from the line-focusing lens 13) of the input surface of the VIPA plate 10, and the light from the line-focusing lens 13 is introduced inside the VIPA plate 10 from this part (namely, the anti-reflection film 10c serves as the light incident window described before).

In addition, this VIPA plate 10 satisfies a "thickness of FSR for WDM matching", and namely is designed so as to satisfy $$2nt \cos \theta = m\lambda \quad (1)$$

and $$FSR = c/2nt \cos \theta \quad (2).$$

In these Equations (1) and (2), n is a refraction index of the glass, t is a physical thickness of the glass, θ is a light flux propagation direction with respect to the center wavelength λ of the individual channels, and also a tilt angle of the light axis of the input light, FSR is an interval of the center wavelength of the individual channels, and c is a light velocity.

Figure 3:
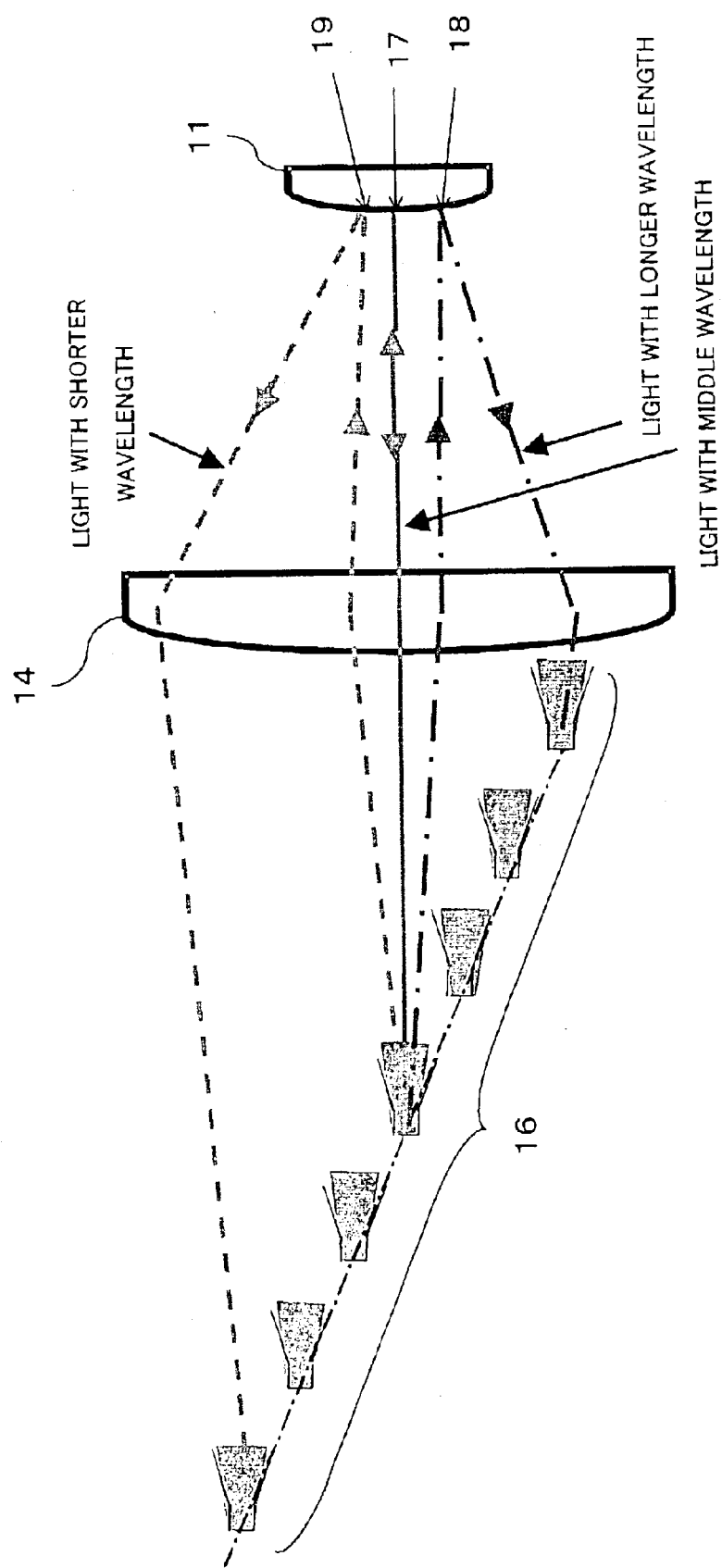
FIG. 3 is a schematic describing a principle of dispersion compensation using the VIPA shown in FIG. 1.

Under these conditions, all wavelength components corresponding to the center wavelength have the same output angle from the VIPA plate 10, and a VIPA 16 is formed where virtual images of beam waists (virtual images apparently emitting the light) are arranged as stairs as schematically shown in FIG. 3, for example. Consequently, the focusing lens 14 (a) focuses the wavelength component corresponding to the center wavelength of the individual channels on a point 17 on the mirror 11, (b) focuses a wavelength component corresponding to a longer wavelength of the individual channels on a point 18 on the mirror 11, and (c) focuses a wavelength component corresponding to a shorter wavelength of the of the individual channels on a point 19 on the mirror 11.

Thus, the light condensed on the mirror 11 returns to arbitrary positions at reflection angles determined by the shape of the mirror 11 placed at the condensed position, and is connected with the optical fiber 15' again after passing through the opposite path of the input. If the mirror 11 has a reflection surface in a simple convex shape as shown in FIG. 3, for example, the light with the shorter wavelength returns to an upper beam waist so as to route on an optical path longer than that for the light with the longer wavelength, resulting in a longer delay.

Thus, in this case, the wavelength compensator 1 generates a negative dispersion. On the other hand, when the reflection surface of the mirror 11 has a concave shape, it generates a positive dispersion. Since the dispersion compensator using the VIPA16 has such a constitution that the light returns through the same optical path, the dispersion compensator is used inline while a circulator 15 is being used. In this way, the VIPA16 is used to compensate the wavelength dispersion in all the channels of the wavelength division multiplex light.

For example, when the thickness t=1 mm and the refraction factor n=1.5 for the VIPA plate 10, entire wavelengths with an interval of 100 GHz meet this condition (FSR=100 GHz). As a result, the VIPA plate 10 provides the same wavelength dispersion simultaneously in the entire channels of the wavelength division multiplexing (WDM) light with the interval of 100 GHz. However, when the mirror 11 has a simple convex shape as shown in FIG. 3, since the same dispersion is provided for the individual channel signal wavelengths, it is very difficult to provide a different dispersion depending on the channel signal wavelength.

Figure 4:
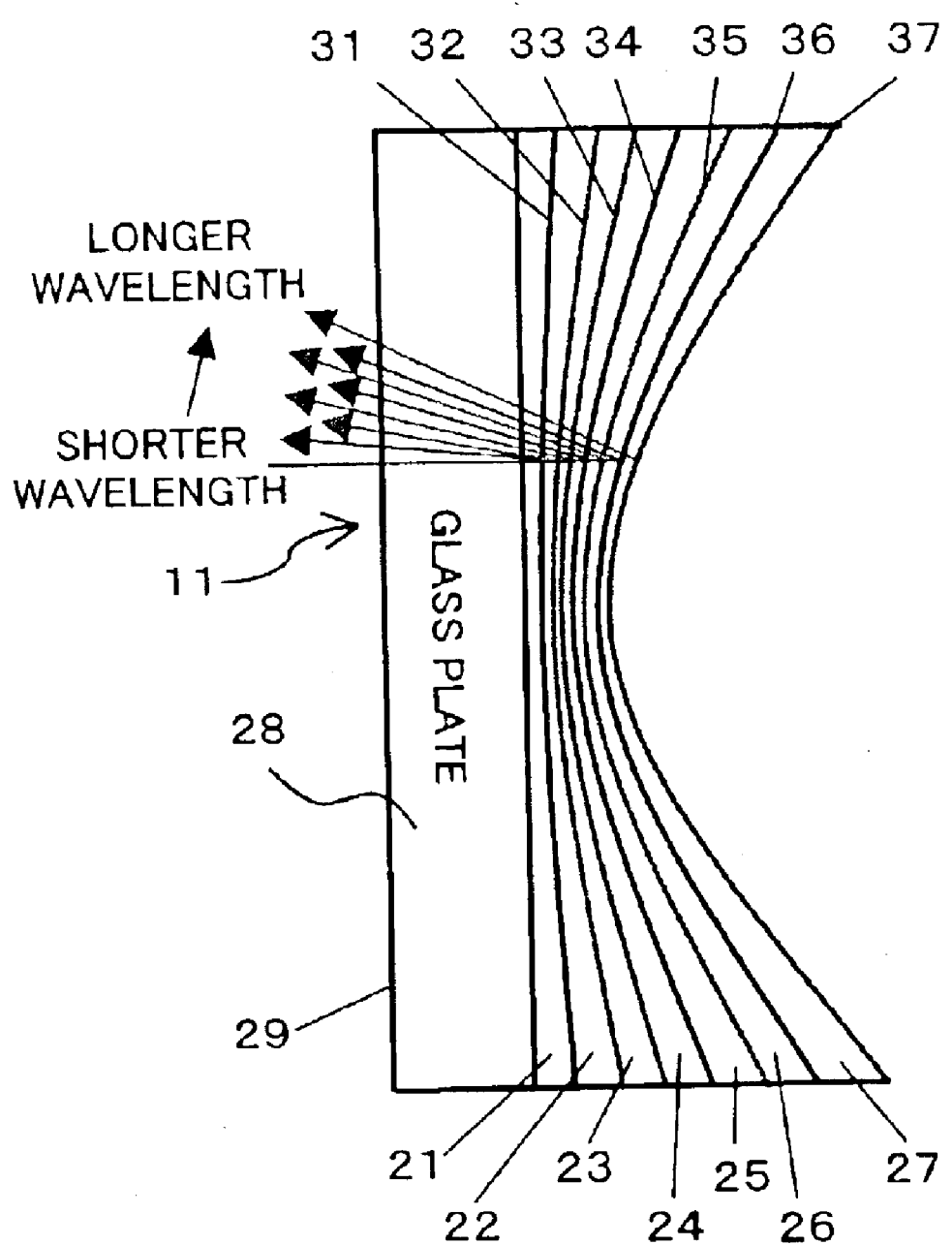
FIG. 4 is a schematic sectional view of a multi-faced mirror shown in FIG. 1.

The mirror 11 of the present embodiment returns the light from the focusing lens 14 to the focusing lens 14, and is constituted by a multi-faced mirror having a special sectional shape as shown in FIG. 4.

Namely, this multi-faced mirror 11 has a structure where a reflection film 29 is formed on one surface (an incident surface of the light) of a glass plate 28, multiple resin layers 21, 22, 23, 24, 25, 26, and 27 are sequentially laminated in the thickness direction (the travel direction of the input light, the right direction in FIG. 1 and FIG. 4) on the other surface, and reflection films 31, 32, 33, 34, 35, 36, and 37 are respectively formed on the surface of the individual resin layers 21, 22, 23, 24, 25, 26, and 27. This multi-faced mirror 11 has a so-called cylindrical shape which has the constant shape in the direction orthogonal to the page.

The individual resin layers 21, 22, 23, 24, 25, 26, and 27 have a transparent (passing light with entire wavelengths included in the input light) characteristic in the range of wavelengths of the input light, and have a curved surface with a different curvature so as to generate a different wavelength dispersion (an angle dispersion). Simultaneously, these resin layers 21 to 27 individually have an optimal shape for providing an approximately constant wavelength dispersion in the individual signal bands (about ±0.08 nm for 10 Gbps transmission). More specifically, the individual resin layers 21 to 27 have a shape so as to generate wavelength dispersions shown in Table 1, for example, when they are used for an E-LEAF fiber with a length of 80 km.

Figure 5:
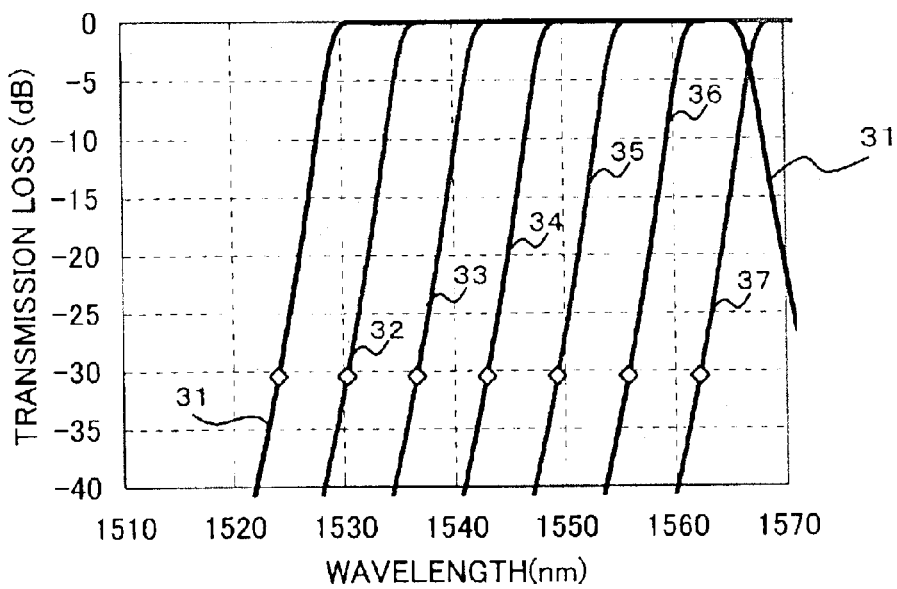
FIG. 5 shows a transmission wavelength characteristic of a broadband band-pass filter applied as an optical film filter constituting a reflection surface of the multi-faced mirror shown in FIG. 4.
Figure 6:
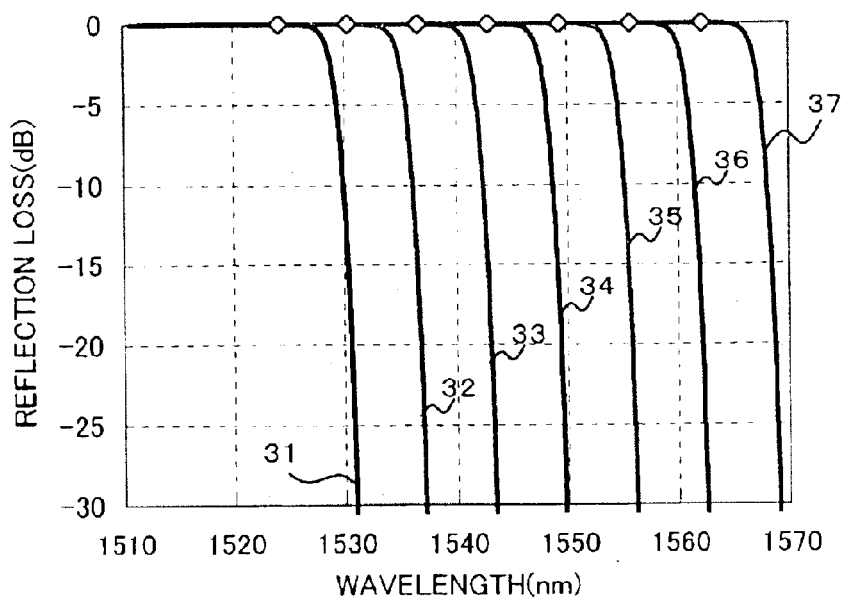
FIG. 6 shows a reflection wavelength characteristic of the broadband band-pass filter applied as the optical film filter constituting the reflection surface of the multi-faced mirror shown in FIG. 4.

The individual reflection films 31, 32, 33, 34, 35, 36, and 37 respectively function as an optical film filter comprising dielectric multilayer film, for example, and a broadband band-pass filter is applied as the optical film filter in this embodiment. Namely, the reflection films 31 to 37 reflect light with a specific wavelength (1524.1 nm, 1530.3 nm, 1536.6 nm, 1542.9 nm, 1549.3 nm, 1555.7 nm, and 1562.2 nm), simultaneously, transmit light with a wavelength longer than the specific wavelength, and are designed such that the reflected signal wavelength increases sequentially beginning from the reflection film 31 closer to the input side of the light as shown in FIG. 5 and FIG. 6.

In more detail, the characteristic of the individual optical film filters 31 to 37 is changed so as to sequentially reflect the longer signal wavelength as the films from the reflection film 31 to the reflection film 37 are further separated from the input side for the light for the WDM signal wavelengths with the interval of 800 GHz (1524.1 nm, 1530.3 nm, 1536.6 nm, 1542.9 nm, 1549.3 nm, 1555.7 nm, and 1562.2 nm) as shown in Table 1, for example.

TABLE 1

| RESIN LAYER | WAVELENGTH DISPERSION (PS/NM) | FILM | WAVELENGTH OF REFLECTED SIGNAL (NM) | WAVELENGTH OF TRANSMITTED SIGNAL (NM) |
|---|---|---|---|---|
| 21 | −140.8 | 31 | 1524.1 | 1530.3–1562.2 |
| 22 | −182.1 | 32 | 1530.3 | 1536.6–1562.2 |
| 23 | −223.8 | 33 | 1536.6 | 1542.9–1562.2 |
| 24 | −265.8 | 34 | 1542.9 | 1549.3–1562.2 |
| 25 | −308.2 | 35 | 1549.3 | 1555.7–1562.2 |
| 26 | −350.8 | 36 | 1555.7 | 1562.2 |
| 27 | −393.9 | 37 | 1562.2 | — |

Thus, when light with the WDM signal wavelengths with the interval of 800 GHz (1524.1 nm, 1530.3 nm, 1536.6 nm, 1542.9 nm, 1549.3 nm, 1555.7 nm, and 1562.2 nm) enters into the multi-faced mirror 11, the light with the shortest wavelength of 1524.1 nm of these wavelengths is reflected on the reflection film 31 first. In this case, the resin layer 21 acts as a mirror surface with a curved shape against the light with the wavelength of 1524.1 nm, and the light is reflected at an angle according to the curvature of the mirror surface.

On the other hand, the reflection film 31 acts as a transparent film against the light with the wavelengths (1530.3 to 1562.2 nm) longer than 1524.1 nm, the light with these wavelengths is transmitted to the next resin layer 22 (the reflection film 32) without being reflected. Then, the light with the shortest wavelength (1530.3 nm) of the wavelengths (1530.3 to 1562.2 nm) of the received light is reflected at an angle according to the curvature of the mirror surface on the reflection film 32, and the light with the longer wavelengths (1536.6 to 1562.2 nm) is transmitted to the next resin layer 23 (the reflection film 33). Then, in the same way, the light from the shortest wavelengths is sequentially reflected on the reflection films 33 to 36, and finally, the light with the longest wavelength of 1562.2.nm is reflected on the reflection film 37.

In this way, since the reflection films (the optical film filters) 31 to 37 function as a reflective mirror for a specific channel signal wavelength, simply transmit light and do not function as a mirror for other wavelengths, when input light including multiple channel signal wavelengths is received, the input light is practically reflected by mirrors with the different shape according to the channel signal wavelength, and it is possible to provide a different wavelength dispersion depending on the individual channel signal wavelength.

Namely, the multi-faced mirror 11 of the present embodiment includes the reflection films 31 to 37 as multiple reflection surfaces which individually reflect light with a different wavelength, and simultaneously, is structured such that these reflection surfaces individually have the different shape.

The following section details the operation of the wavelength dispersion compensator 1 of the present embodiment as constituted above. The following section describes an example where a wavelength dispersion and a wavelength dispersion slope generated on an E-LEAF fiber with a length of 800 km (dispersion=3.852 [ps/nm/km], dispersion slope=0.083 [ps/nm$^2$/km]) are compensated for WDM light with WDM signal wavelengths with an interval of 800 GHz. Also, a glass plate with the reflectance n=1.85, and the thickness t=0.4 mm is used as the VIPA plate 10 so as to realize that FSR=200 GHz. Thus, the entire WDM signal wavelengths with the interval of 800 GHz (channels) are split similarly depending on the wavelength.

First, after the WDM light emitted from the optical fiber 15' is converted into collimated light by the collimating lens 12, only the one way of the collimated light is focused by the line focusing lens 13, and enters into the VIPA plate 10 through the light incident window 10c.

Figure 2:
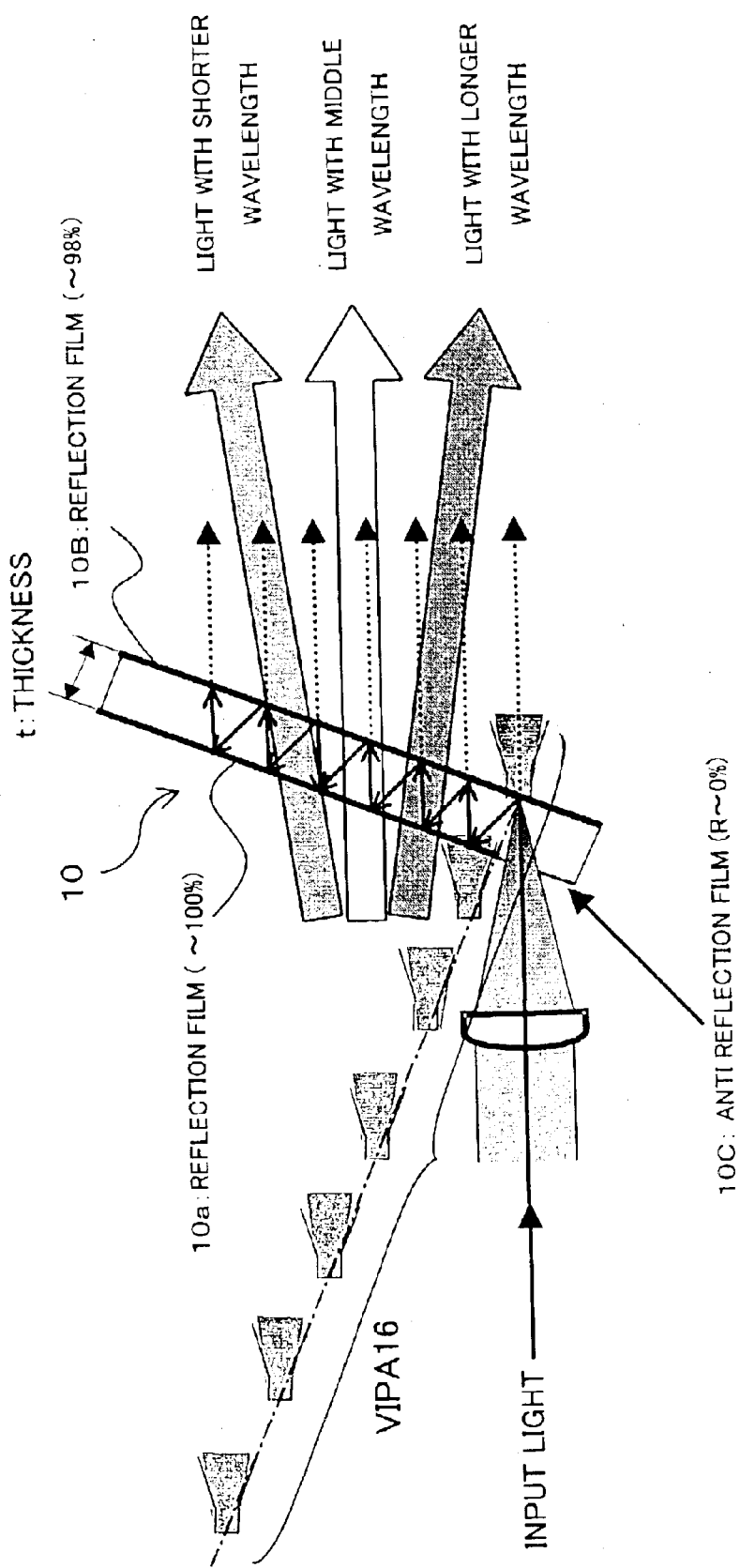
FIG. 2 is a schematic view describing a light-splitting principle of the VIPA shown in FIG. 1.

The signal light coming into the VIPA plate 10 is reflected multiple times in the VIPA plate 10. At this time, a part of the signal light is emitted from the multiple positions on the surface of the VIPA plate 10 where the reflection film 10b is formed. The beam waists of the emitted light form the VIPA16 where the virtual images individually emitting the light are arranged as steps as shown in FIG. 2. Since this VIPA16 is a diffraction grating with a high diffraction order, the emitted light propagates in a direction satisfying the interference condition.

The emitted light split by the VIPA16 is focused on the multi-faced mirror 11 by the focusing lens 14. Then the light with the shortest wavelength of 1524.1 nm is reflected on the reflection film (the curved surface mirror) 31 with the curved surface shape of the resin layer 21, and is reflected according to the curvature of the mirror surface. Since the resin layer 21 has a convex shape for providing a wavelength dispersion of −140.8 ps/nm, the light with the wavelength of 1524.1 nm returns to the top beam waist of the VIPA plate 10, the optical path increases compared with that for the light with a longer wavelength, and the negative dispersion of −140.8 ps/nm is generated.

Then, the light with the wavelengths (1530.3 to 1562.2 nm) longer than 1524.1 nm is transmitted through the reflection film 31, and the light with the shortest wavelength of 1530.3 nm of them is reflected on the reflection film (the curved surface mirror) 32 having the curved surface shape of the resin layer 22. Since the resin layer 22 has a convex shape for providing a wavelength dispersion of −182.1 ps/nm, the negative dispersion of −182.1 ps/nm is generated for the light with the wavelength of 1530.3 nm.

Then, the wavelength dispersions −223.8 ps/nm, −265.8 ps/nm, −308.2 ps/nm, −350.9 ps/nm, and −393.9 ps/nm according to the resin layers 23, 24, 25, 26, and 27 on which the reflection films 33, 34, 35, 36, and 37 are formed are respectively generated for the wavelengths of 1536.6 nm, 1542.9 nm, 1549.3 nm, 1555.7 nm, and 1562.2 nm in the same way.

When the individual wavelength components are reflected on the film of the individual resin layers, though they are reflected at different focusing positions (mirror depths), if the focal length of the focusing lens 14 is sufficiently larger than the difference in the focusing positions, a large difference in the loss is not generated among the wavelengths.

Figure 7:
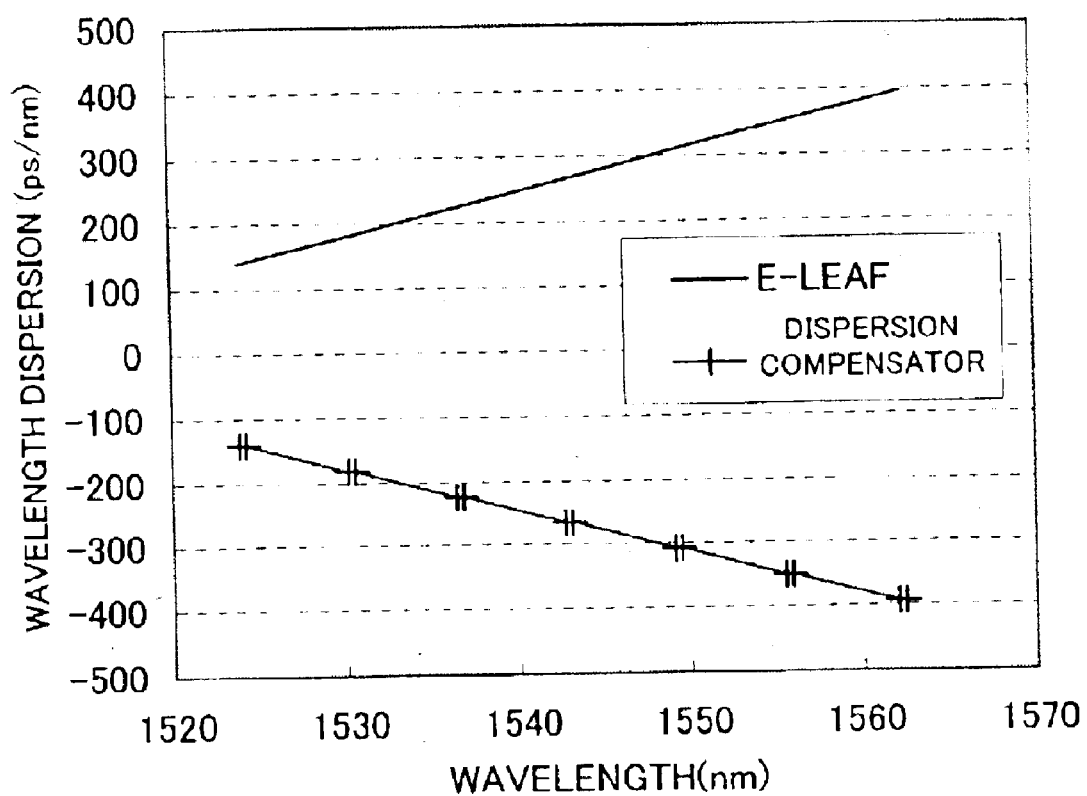
FIG. 7 shows wavelength dispersions (slopes) of an E-LEAF fiber (80 km) and the wavelength dispersion compensation apparatus according to the present embodiment.

FIG. 7 shows a wavelength dispersion characteristic of the wavelength dispersion compensator 1 of the present embodiment. As FIG. 7 shows, the wavelength dispersion compensator 1 of the present embodiment generates a wavelength dispersion and a wavelength dispersion slope opposite to the wavelength dispersion and the wavelength dispersion slope of the E-LEAF fiber, and is extremely useful as a wavelength dispersion compensator of the E-LEAF fiber.

Especially, as FIG. 5 and FIG. 6 clearly show, both the transmission loss and the reflection loss of the optical film filters 31, 32, 33, 34, 35, 36, and 37 are small, and consequently, the increase of the loss compared with the conventional wavelength compensator is extremely small.

When this wavelength dispersion compensator 1 was actually installed on a WDM transmission apparatus, eight channels of signal wavelengths at an interval of 800 GHz comprising 1524.1 nm, 1530.3 nm, 1536.6 nm, 1542.9 nm, 1549.3 nm, 1555.7 nm, and 1562.2 nm are modulated by 40 Gbit/s, and the waveform after the transmission through the E-LEAF fiber (80 km) was checked, an excellent eye aperture was obtained.

While the number of channels of the WDM signal wavelengths is eight in the example above, it is clear that providing the number of the reflection surfaces (the resin layers and the reflection films) of the multi-faced mirror 11 corresponding to a channel number different from this handles them.

With the wavelength dispersion compensator 1 of the present embodiment where the mirror 11, which reflects the light entering from the focusing lens 14 which focuses the output light of the VIPA plate 10, and returns it to the focusing lens 14, is provided, the light reflected on this mirror 11 returns to the VIPA plate 10 through the focusing lens 14, and is emitted from the transparent area (the light incident window 10c) after reflected multiple times in the VIPA plate 10, since the mirror 11 is constituted by the multi-faced mirror which has multiple reflection surfaces 31 to 37 in the traveling direction of the input light for individually reflecting light with a different wavelength, and simultaneously, for individually providing a different wavelength dispersion, the light included in the WDM signal light with the different wavelength is reflected on the reflection surfaces 31 to 37 having the different shape so as to reflect at the different angle depending on the wavelength.

Thus, the new variable dispersion compensator 1 which provides a different optical path difference, namely a different wavelength dispersion, depending on the channel signal wavelength of the WDM signal, and simultaneously has the optical loss lower than the conventional compensator.

(B) Description of Manufacturing Method of Multi-faced Mirror

The following section describes an example of a manufacturing method of the multi-faced mirror 11 described above while referring to FIG. 8.

As shown in FIG. 8A, an appropriate amount of (first) ultraviolet curing resin with a light transmission characteristic 40 is applied on the glass plate 28 (first step). In this process, it is preferable to apply a silane coupling agent on the glass plate 28 in advance so as to increase a binding force between the glass plate 28 and the resin 40.

Then, as shown in FIG. 8B, a (first) die 41 with a desired (first) sectional shape (a curved surface shape with a desired curvature) is pressed against (brought in press contact with) the resin 40 without generating a bubble, and ultraviolet 42 is irradiated from a side of the glass plate 28 so as to harden the resin 40 (as a result, the resin layer 21 is formed, second step). In this process, it is preferable to apply a release agent such as a fluoride release agent or a surface treatment on the surface of the die 41 so as to easily release the die in a later release process.

Then, as shown in FIG. 8C, the die 41 is released (separated) from the resin layer 21 (third step), and the reflection film 31, which is the (first) optical film filter comprising a dielectric multilayer film, and serves as the (first) reflection surface, is formed on the resin layer 21 (forth step). This optical film filter 31 is formed so as to have a predetermined transmission wavelength and a predetermined reflection wavelength as described in FIG. 5 and FIG. 6 above. Since the resin is sensitive to a high temperature, a film forming method such as ion assisted deposition and ion beam sputtering which forms a dense film at a low temperature is appropriate as the film forming method. Further, if the outer most surface of the reflection film 31 comprising the dielectric multilayer film is an $SiO_2$ film, applying silane coupling agent as described before increases a binding force with the resin layer 22 formed on the reflection film 31 later.

Then, as shown in FIG. 8D, (second) ultraviolet curing resin 40 with a light transmission characteristic is applied on the reflection film 31 (fifth step), a (second) die 43 with a sectional shape different from that of the die 41 (a curved surface shape with a different curvature) is pressed against over it, and the ultraviolet 42 is irradiated from the side of the glass plate 28 so as to harden the resin 40 (as a result, the resin layer 22 is formed on the reflection film 31, sixth step).

Then, the die 43 is released from the resin layer 22 as shown in FIG. 8E (seventh step), and the reflection film 32 serving as the (second) optical film filter comprising a dielectric multilayer film (and having the transmission wavelength and the reflection wavelength as described above in FIG. 5 and FIG. 6) is further formed on the resin layer 22 (eighth step).

Then, in the same way, by repeating the individual steps comprising applying the ultraviolet curing resin 40, pressing a die, irradiating ultraviolet (hardening and forming the resin layer), releasing the die, and forming the optical film filter, namely by repeating the fifth step to the eighth step such that the (second) optical film filter 32 is treated as the formed filter corresponding to the (first) optical film filter 31, the multi-faced mirror 11 including the multiple reflection surfaces 31 to 37 in the thickness direction where the individual reflection surfaces 31 to 37 have the curved surface shape different in curvature is easily manufactured as shown in FIG. 4.

When the multi-faced mirror 11 is manufactured in the present manufacturing method, if the multi-faced mirror 11 has the so-called cylindrical shape having the constant shape in the direction orthogonal to the page (the depth direction) in FIG. 4, for example, since a relatively large mirror is produced at once, and then, the mirror can be cut into multiple small mirrors, there are few problems in the manufacturing cost. The present manufacturing method is simply an example, and the multi-faced mirror 11 maybe manufactured in other method such as etching. These points are still true for the following individual variations.

(C) Description of First Variation

Figure 9:
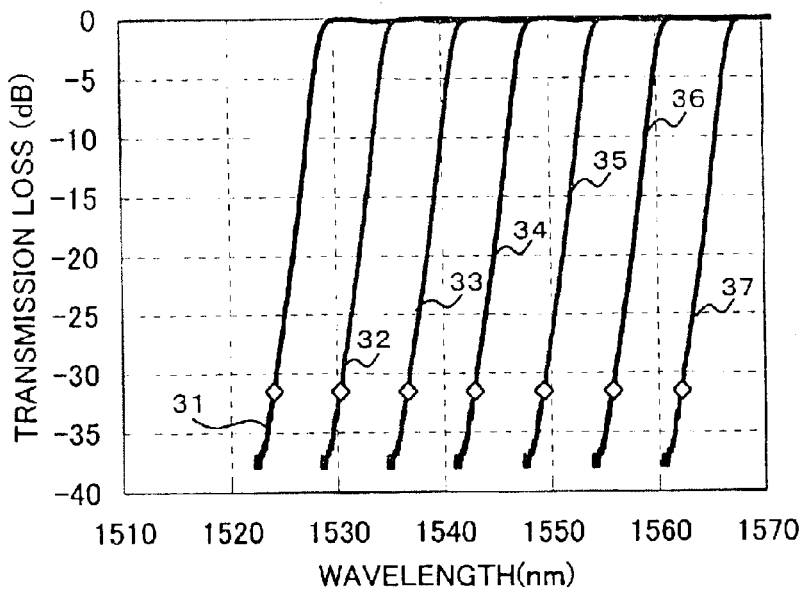
FIG. 9 shows a transmission wavelength characteristic of a long wave pass filter applied as an optical film filter constituting a reflection surface in a first variation of the multi-faced mirror shown in FIG. 4.
Figure 10:
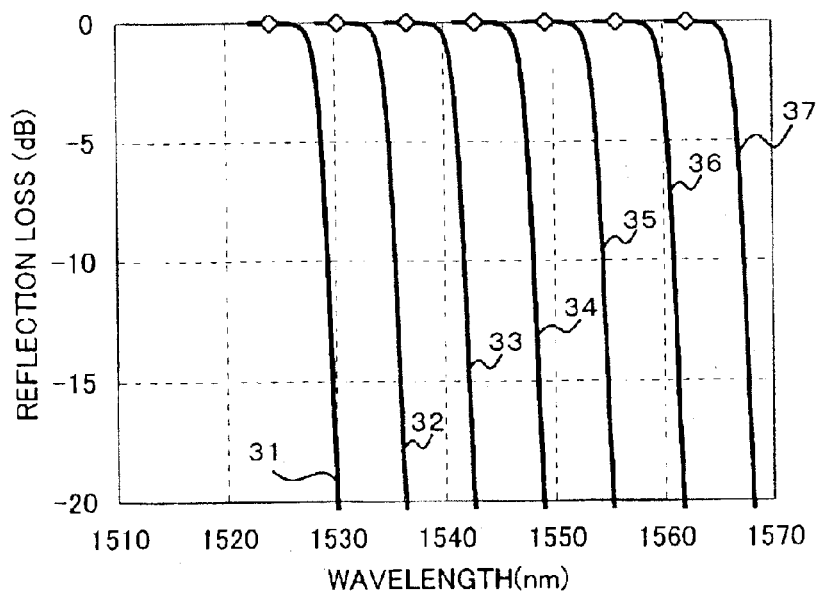
FIG. 10 shows a reflection wavelength characteristic of the long wave pass filter applied as the optical film filter constituting the reflection surface in the first variation of the multi-faced mirror shown in FIG. 4.

While the optical film filters 31 to 37 formed on the individual resin layers 21 to 27 of the multi-faced mirror 11 are the broadband band-pass filters in the embodiment described above, the multi-faced mirror 11 similar to the one described above is realized when long wave (long wavelength) pass filters which individually reflect light with the different specific wavelength (1524.1 nm, 1530.3 nm, 1536.6 nm, 1542.9 nm, 1549.3 nm, 1555.7 nm, and 1562.2 nm), and simultaneously transmit light with a wavelength longer than the specific wavelength as shown in FIG. 9 and FIG. 10 as the optical film filters 31 to 37 are applied.

When the characteristic of the optical film filters 31 to 37 is changed such that wavelength of the signal reflected individually on them sequentially increases from the reflection film 31 closer to the input side of the light to the reflection film 37 as shown in Table 2, an effect equivalent to that of the multi-faced filter 11 shown in FIG. 4 is obtained. Table 2 below shows an example where a TW-RS fiber (dispersion: 4.219 [ps/nm/km], dispersion slope: 0.045 [ps/nm$^2$/km]) with a length of 800 km is compensated.

TABLE 2

| RESIN LAYER | WAVELENGTH DISPERSION (PS/NM) | FILM | WAVELENGTH OF REFLECTED SIGNAL (NM) | WAVELENGTH OF TRANSMITTED SIGNAL (NM) |
|---|---|---|---|---|
| 21 | −246.8 | 31 | 1524.1 | 1530.3–1562.2 |
| 22 | −269.2 | 32 | 1530.3 | 1536.6–1562.2 |
| 23 | −291.8 | 33 | 1536.6 | 1542.9–1562.2 |
| 24 | −314.6 | 34 | 1542.9 | 1549.3–1562.2 |
| 25 | −337.5 | 35 | 1549.3 | 1555.7–1562.2 |
| 26 | −360.7 | 36 | 1555.7 | 1562.2 |
| 27 | −384.0 | 37 | 1562.2 | — |

Figure 11:
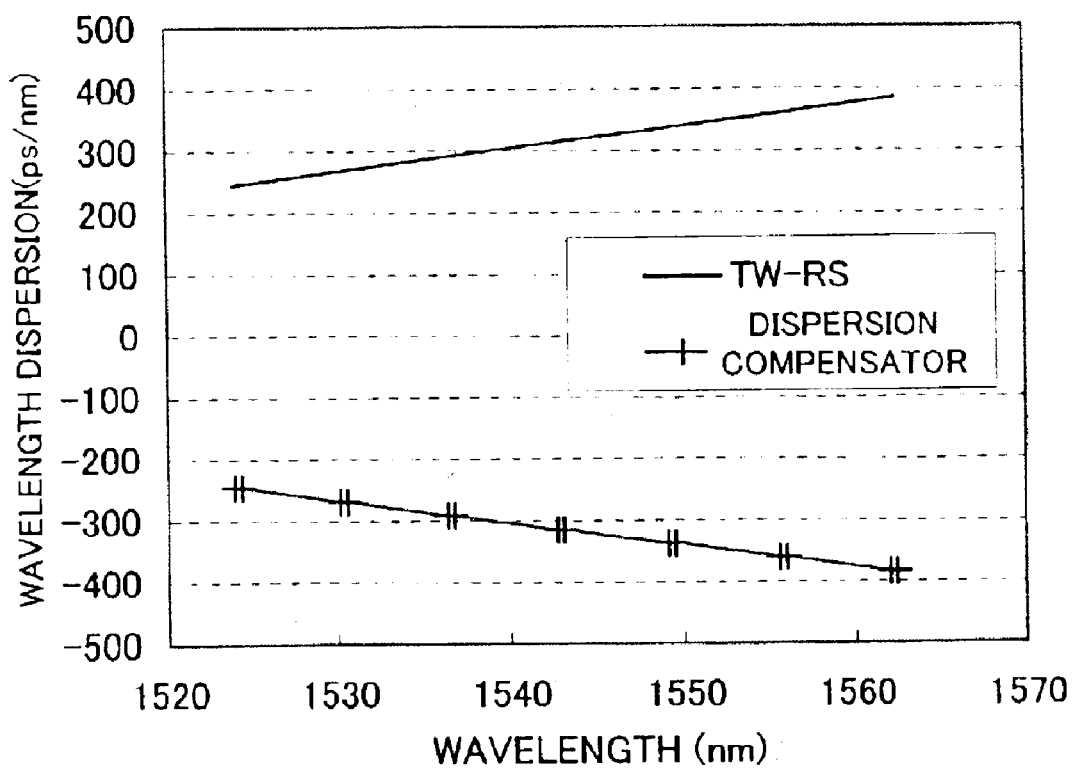
FIG. 11 shows wavelength dispersions (slopes) of a TW-RS fiber (80 km) and a wavelength dispersion compensation apparatus according to the first variation of the present embodiment.

Then, this multi-faced mirror 11 was installed on the wavelength dispersion compensator 1 as the embodiment described above, and compensated WDM signal wavelengths with an interval of 800 GHz, the wavelength dispersion characteristic of the wavelength dispersion compensator 1 shown in FIG. 11 was obtained. As FIG. 11 shows, a wavelength dispersion and a wavelength dispersion slope opposite to the wavelength dispersion and the wavelength dispersion slope of the TW-RS fiber are generated, and thus this compensator is effective as the wavelength dispersion compensator 1 for the TW-RS fiber.

In this variation, as FIG. 9 and FIG. 10 clearly show, since the transmission loss and the reflection loss of the optical film filters 31 to 37 are small, it is possible to reduce the optical loss compared with the conventional wavelength dispersion compensator.

(D) Description of Second Variation

While, in the first variation, the example where the wavelength reflected on the multi-faced mirror 11 sequentially increases from the input side of the light is described, this section describes an example where a multi-faced mirror is designed such that the reflected wavelength sequentially decreases from the input side of the light. In the following section, elements with a numeral the same as that described before are the same or similar elements unless otherwise specified.

Figure 12:
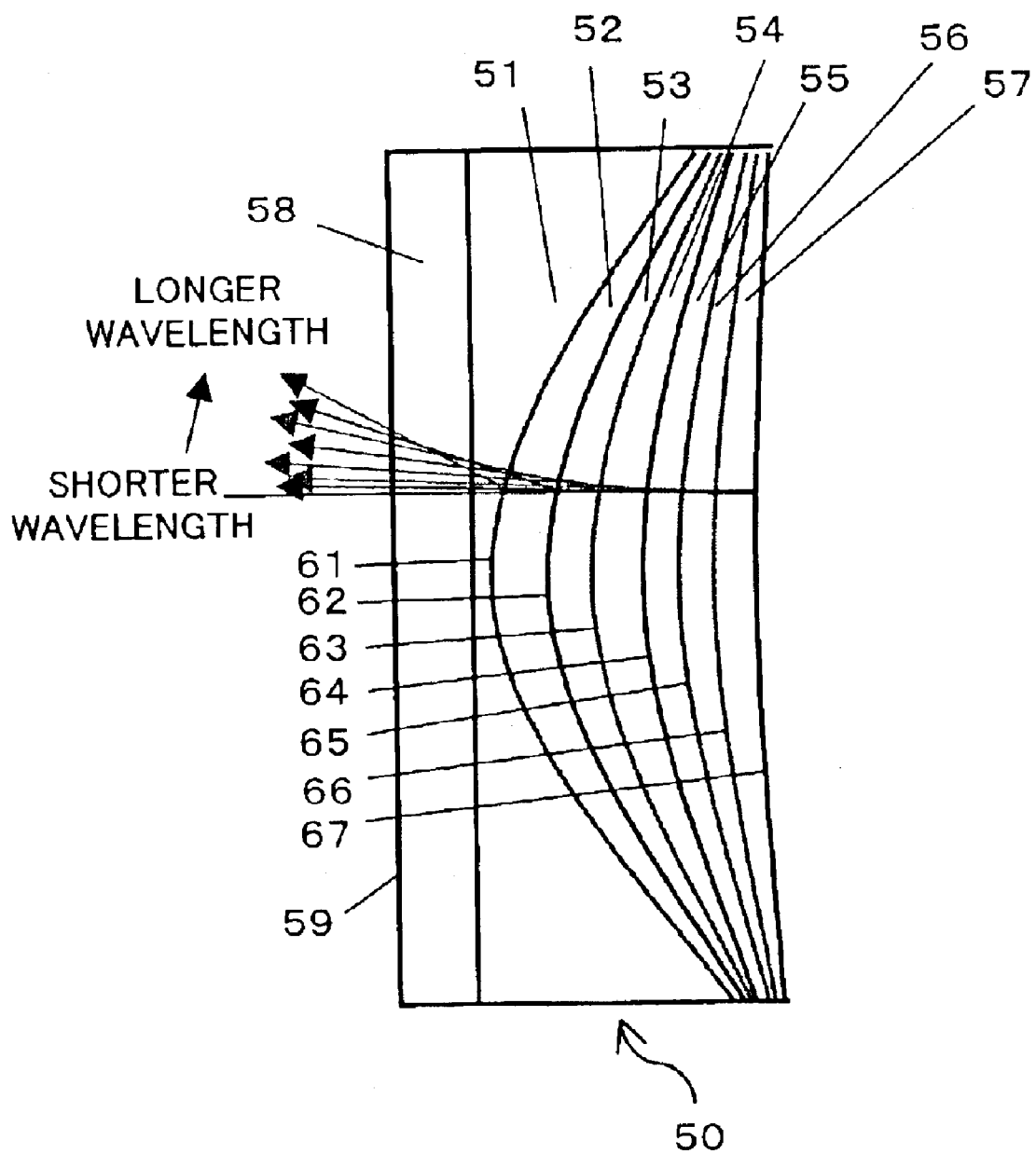
FIG. 12 is a schematic sectional view showing a second variation of the multi-faced mirror shown in FIG. 4.

FIG. 12 is a sectional view showing a second variation of the multi-faced mirror 11 described above, and a multi-faced mirror 50 shown in FIG. 12 has a structure where multiple resin layers 51, 52, 53, 54, 55, 56, and 57 are formed by sequentially laminating them in the thickness direction (a travel direction of the input light, the right direction on the page in FIG. 12) on a surface of a glass plate 58 opposite to a surface (the incident surface of the light) where an anti-reflection film 59 is formed, and simultaneously reflection films 61, 62, 63, 64, 65, 66, and 67 are respectively formed on the surface of the individual resin layers 51, 52, 53, 54, 55, 56, and 57. This multi-faced mirror 50 also has the so-called cylindrical shape which has the same shape in the direction orthogonal to the page.

The individual resin layers 51, 52, 53, 54, 55, 56, and 57 individually have the transparent (transmitting light with entire wavelengths included in the input light) characteristic in the range of wavelengths of the input light, and have a curved surface shape with a different curvature so as to individually generate a different wavelength dispersion (an angle dispersion). Simultaneously, these resin layers 51 to 57 individually have a shape optimized so as to generate almost a constant wavelength dispersion in the individual signal ranges (approximately ±0.08 nm for 10 Gbps transmission). More specifically, the individual resin layers 51 to 57 have such a shape as generating a wavelength dispersion shown in Table 3 when they are used for the SMF with a length of 80 km, for example.

Figure 13:
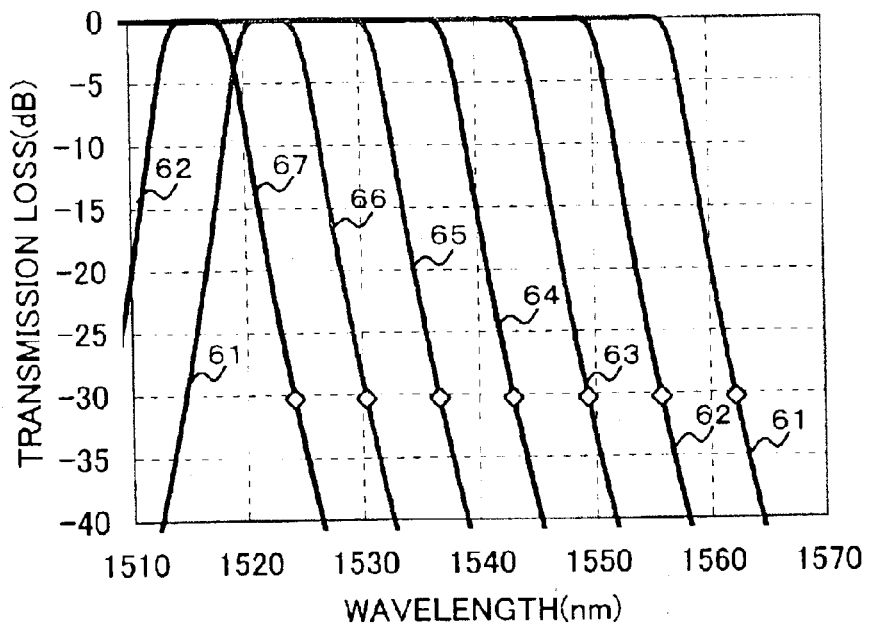
FIG. 13 shows a transmission wavelength characteristic of a broadband band-pass filter applied as an optical film filter constituting a reflection surface of the multi-faced mirror shown in FIG. 12.
Figure 14:
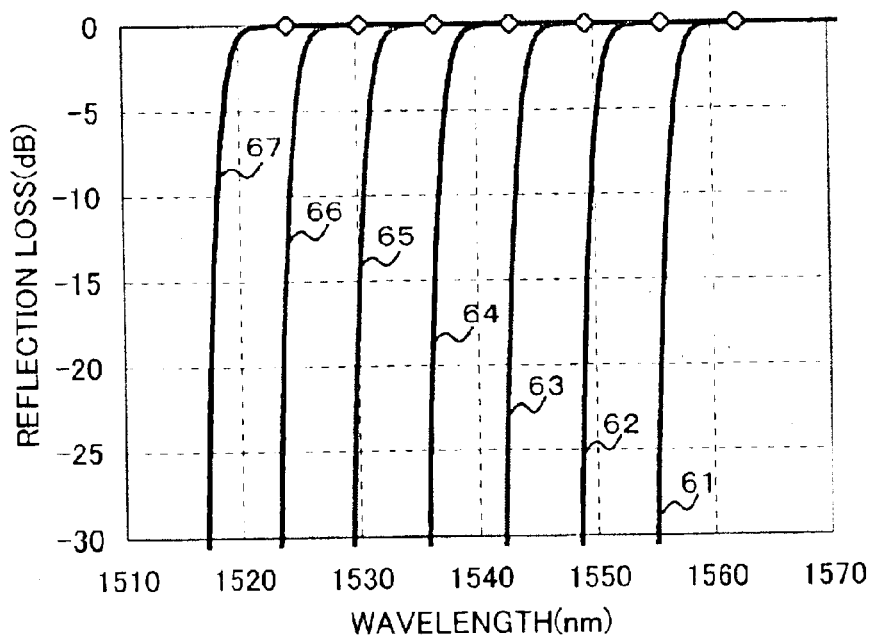
FIG. 14 shows a reflection wavelength characteristic of the broadband band-pass filter applied as the optical film filter constituting the reflection surface of the multi-faced mirror shown in FIG. 12.

Also, the individual reflection films 61, 62, 63, 64, 65, 66, and 67 respectively function as an optical film filter comprising dielectric multilayer film, for example, and a broadband band-pass filter is applied to the optical film filter in this variation. Namely, the reflection films 61 to 67 respectively have such characteristic that light with a specific wavelength (1524.1 nm, 1530.3 nm, 1536.6 nm, 1542.9 nm, 1549.3 nm, 1555.7 nm, and 1562.2 nm) different from one another is reflected, and simultaneously, light with a wavelength shorter than the specific wavelength is transmitted, and are designed such that the reflected signal wavelength decreases sequentially beginning from the reflection film 61 closer to the input side of the light in this case as shown in FIG. 13 and FIG. 14.

In more detail, the characteristic of the individual optical film filters 61 to 67 is changed so as to sequentially reflect the shorter signal wavelength as the films from the reflection film 61 closer to the input side to the reflection film 67 are further separated for the light for the WDM signal wavelengths with the interval of 800 GHz (1524.1 nm, 1530.3 nm, 1536.6 nm, 1542.9 nm, 1549.3 nm, 1555.7 nm, and 1562.2 nm) as shown in Table 3, for example. Table 3 below describes an example where a wavelength dispersion and a wavelength dispersion slope of the SMF (dispersion=16.79 [ps/km/km], dispersion slope=0.057 [ps/nm$^2$/km]) of a length of 80 km are compensated.

TABLE 3

| RESIN LAYER | WAVELENGTH DISPERSION (PS/NM) | FILM | WAVELENGTH OF REFLECTED SIGNAL (NM) | WAVELENGTH OF TRANSMITTED SIGNAL (NM) |
|---|---|---|---|---|
| 51 | −1228.3 | 61 | 1562.2 | 1524.1–1555.7 |
| 52 | −1256.7 | 62 | 1555.7 | 1524.1–1549.3 |
| 53 | −1285.3 | 63 | 1549.3 | 1524.1–1542.9 |
| 54 | −1314.1 | 64 | 1542.9 | 1524.1–1536.6 |
| 55 | −1343.2 | 65 | 1536.6 | 1524.1–1530.3 |
| 56 | −1372.5 | 66 | 1530.3 | 1524.1 |
| 57 | −1402.1 | 67 | 1524.1 | — |

Thus, when the light including the WDM signal wavelengths with the interval of 800 GHz (1524.1 nm, 1530.3 nm, 1536.6 nm, 1542.9 nm, 1549.3 nm, 1555.7 nm, and 1562.2 nm) enters into the multi-faced mirror 50, the light with the longest wavelength of 1562.2 nm is reflected on the reflection film 61 first. At this time, the resin layer 51 acts as a mirror surface with a curved shape against the light with the wavelength of 1562.2 nm, and the light is reflected at an angle according to the curvature of the mirror surface.

Since the resin layer 51 has a convex shape for providing a wavelength dispersion of −1228.3 ps/nm, the light with the wavelength of 1562.2 nm returns to the top beam waist of the VIPA plate 10, the optical path increases compared with that for the light with a longer wavelength, and the negative dispersion of −1228.3 ps/nm is generated.

On the other hand, the reflection film 61 acts as a transparent film against the light with the wavelengths (1524.1 to 1555.7 nm) shorter than 1562.2 nm, the light with these wavelengths is transmitted without being reflected. Then, the light with the next longer wavelength of 1555.7 nm is reflected at an angle according to the curvature of the mirror surface on the reflection film 62, and the light with the shorter wavelengths (1524.1 to 1549.3 nm) is transmitted. Since the resin layer 52 has a convex shape for providing a wavelength dispersion of −1256.7 ps/nm, a negative dispersion of −1256.7 ps/nm is generated for the light with the wavelength of 1555.7 nm.

Then, the light with a longer wavelength is sequentially reflected on the reflection films 63 to 66, finally the light with the shortest wavelength of 1524.1 nm is reflected on the reflection film 67, the wavelength dispersions −1285.3 ps/nm, −1314.1 ps/nm, −1343.2 ps/nm, −1372.5 ps/nm, and −1402.1 ps/nm according to the resin layers 63 to 67 on which the reflection films 63 to 67 are formed are respectively generated for the wavelengths of 1549.3 nm, 1542.9 nm, 1536.6 nm, 1530.3 nm, and 1524.1 nm in the same way.

Figure 17:
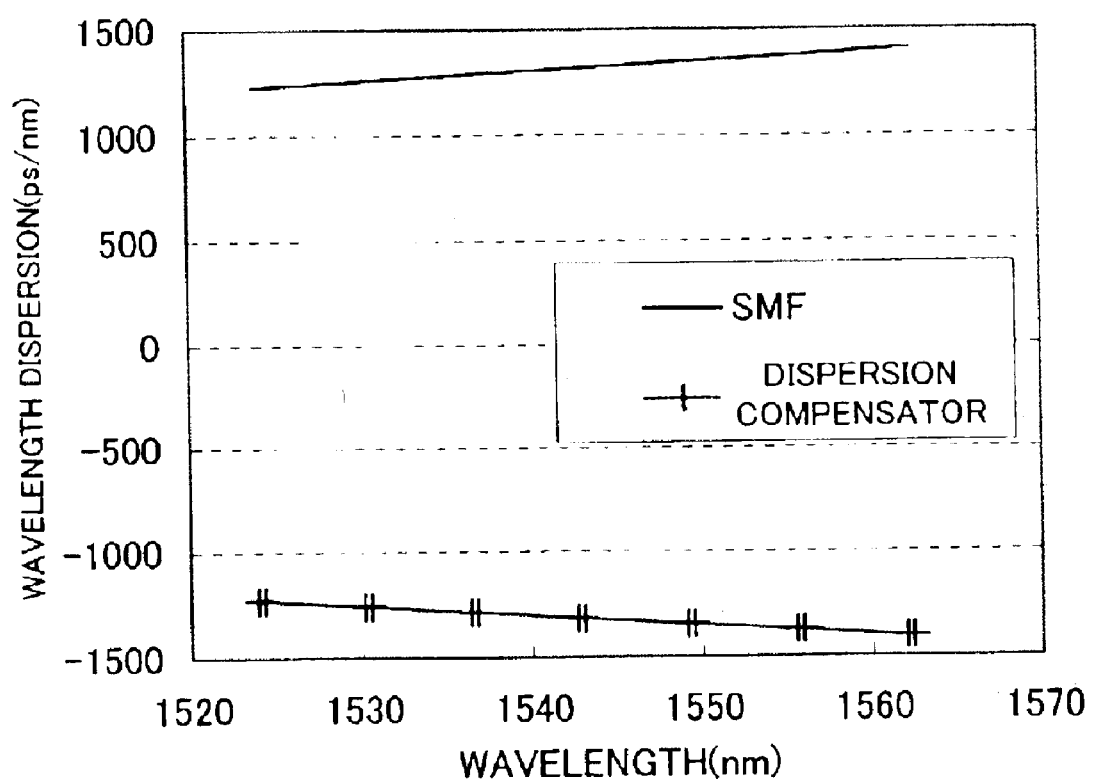
FIG. 17 shows wavelength dispersions (slopes) of an SMF (80 km) and a wavelength dispersion compensation apparatus according to a third variation of the present embodiment.
Figure 18:
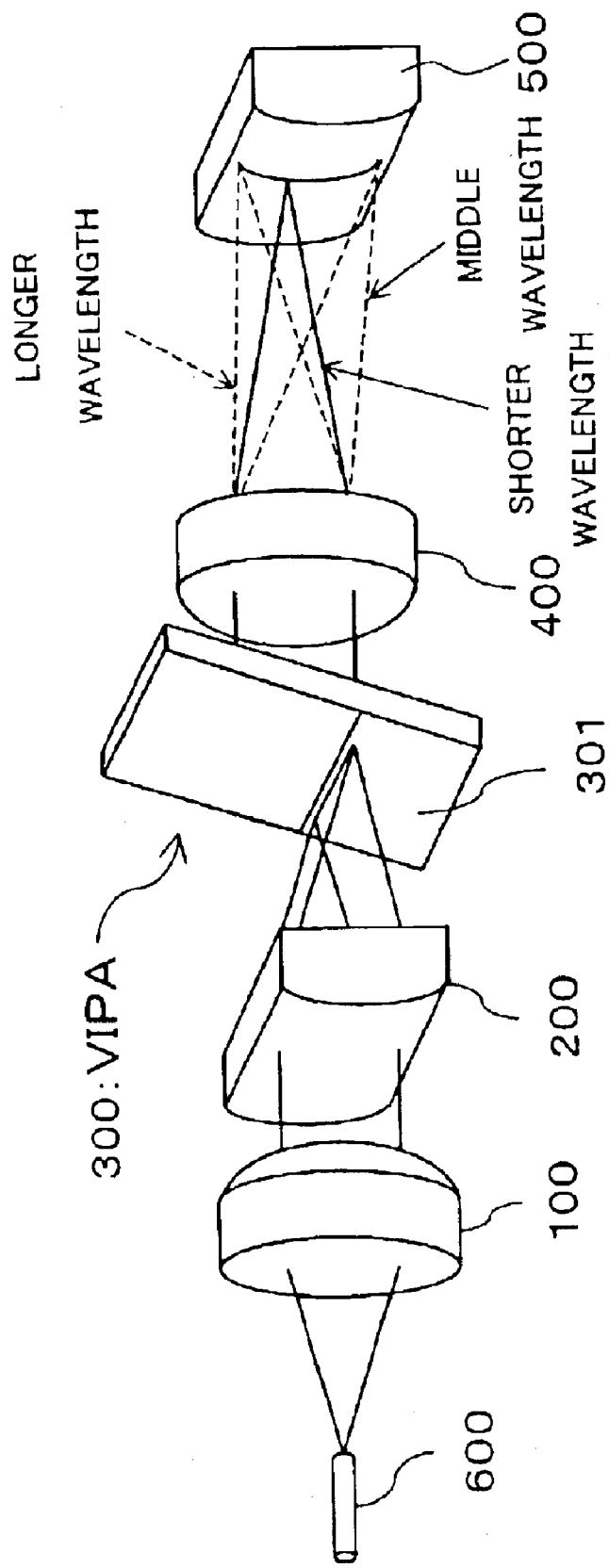
FIG. 18 is a schematic perspective view showing an example of a conventional optical apparatus including a VIPA.
Figure 19:
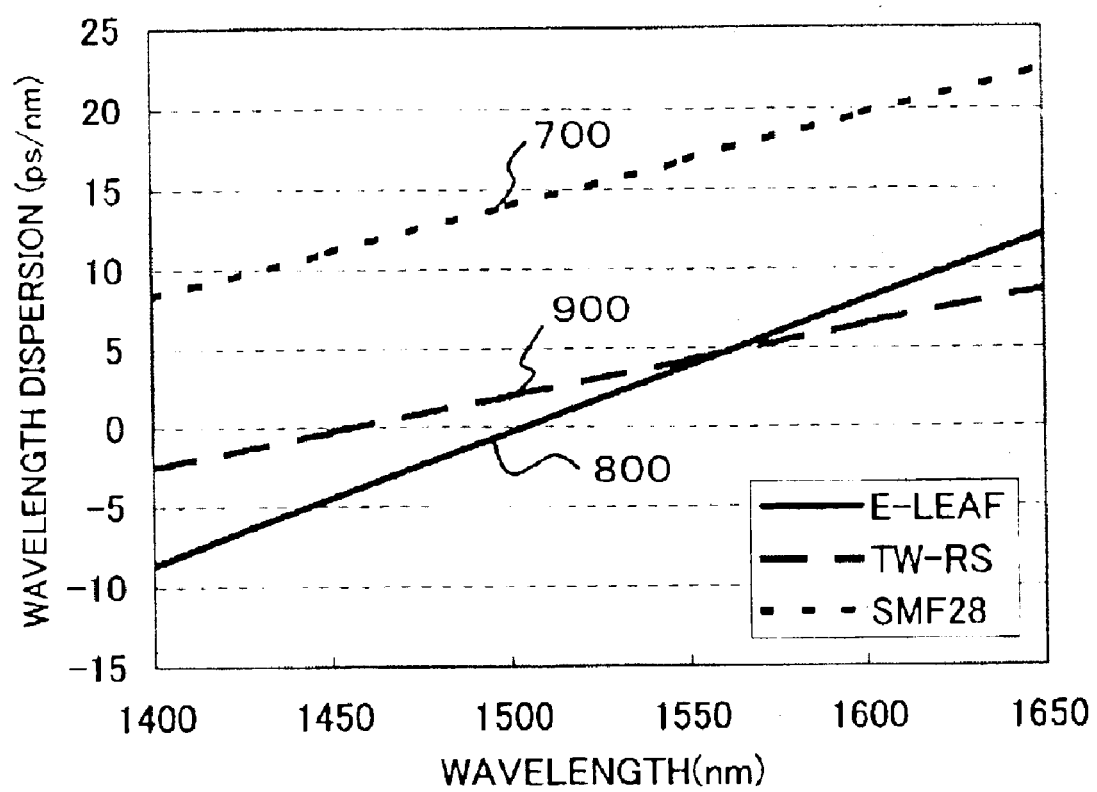
FIG. 19 shows wavelength dispersions and wavelength dispersion slopes according to types of optical fibers.

As a result, the wavelength dispersion compensator 1 on which the multi-faced mirror 50 is installed generates a wavelength dispersion characteristic shown in FIG. 17, namely a wavelength dispersion and a wavelength dispersion slope opposite to the wavelength dispersion and the wavelength dispersion slope of the SMF, for example, and is extremely useful as a wavelength dispersion compensator 1 for the SMF.

Especially, as FIG. 13 and FIG. 14 clearly show, the transmission loss and the reflection loss of the optical film filters 61 to 67 used for the multi-faced mirror 50 in the present variation are small, and consequently, the optical loss compared with the conventional wavelength compensator is small.

This multi-faced mirror 50 is manufactured in a method similar to the manufacturing method described in FIG. 8. However, as FIG. 4 and FIG. 12 clearly show, since it is necessary to form the resin layer 51 of the multi-faced mirror 50 of the present variation thicker than the resin layer 21 of the multi-faced mirror 11, it is easier to manufacture the multi-faced mirror 11 described before.

(E) Description of Third Variation

Figure 15:
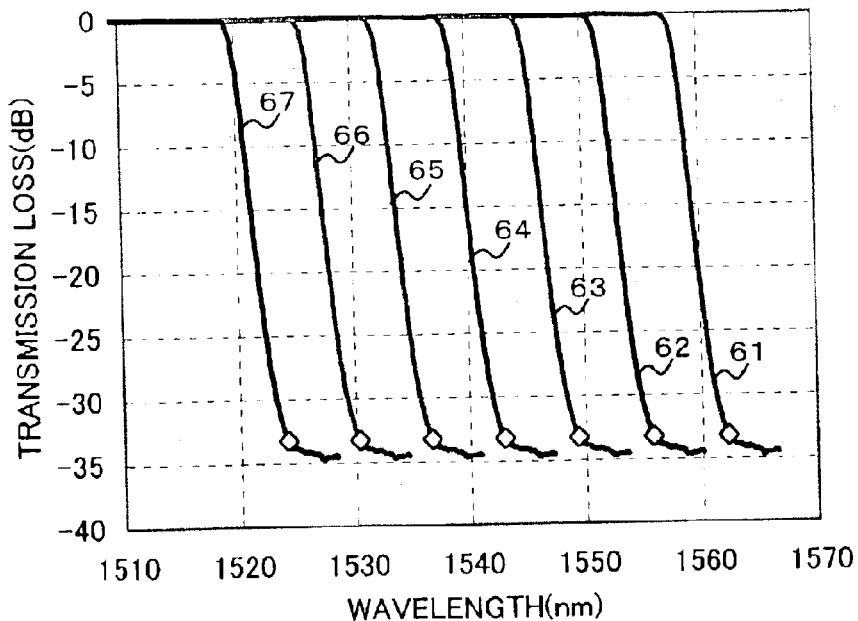
FIG. 15 shows a transmission wavelength characteristic of a short wave pass filter applied as the optical film filter constituting the reflection surface of the multi-faced mirror shown in FIG. 12.
Figure 16:
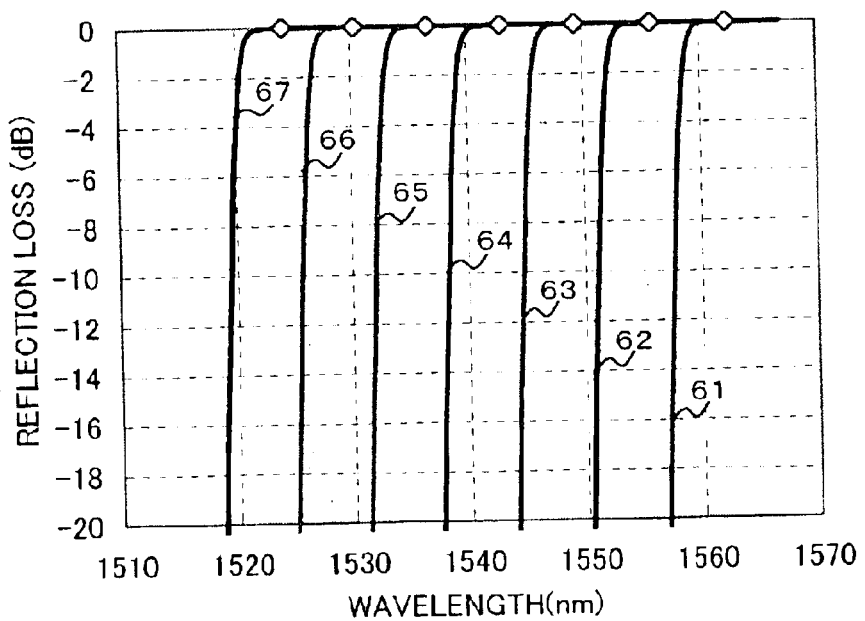
FIG. 16 shows a reflection wavelength characteristic of the short wave pass filter applied as the optical film filter constituting the reflection surface of the multi-faced mirror shown in FIG. 12.

While the optical film filters 61 to 67 formed on the individual resin layers 51 to 57 of the multi-faced mirror 50 are broadband band-pass filters in the second variation described above, the multi-faced mirror 50 similar to the one of the second variation described above is realized when short wave (short wavelength) pass filters which individually reflect light with the different specific wavelength (1524.1 nm, 1530.3 nm, 1536.6 nm, 1542.9 nm, 1549.3 nm, 1555.7 nm, and 1562.2 nm), and simultaneously transmit light with a wavelength shorter than the specific wavelength as shown in FIG. 15 and FIG. 16 are used.

When the characteristic of the optical film filters 61 to 67 is changed such that wavelength of the signal reflected individually on them sequentially decreases from the reflection film 61 closer to the input side of the light to the reflection film 67 as shown in Table 3, the multi-faced mirror 50 and the wavelength dispersion compensator 1 providing an operation and an effect equivalent to those of the second variation are realized.

In this variation, as FIG. 15 and FIG. 16 clearly show, since the transmission loss and the reflection loss of the optical film filters 61 to 67 are small, it is possible to reduce the optical loss compared with the conventional wavelength dispersion compensator. Also, the multi-faced mirror 50 in this case is manufactured in a manufacturing method similar to the manufacturing method described in FIG. 8.

(F) Other

While the broadband band-pass filters or the long wave filters (the broadband band-pass filters or the short wave pass filters) are applied as the optical film filters 31 to 37 (or 61 to 67), the function of the multi-faced mirror 11 (50) is realized by applying a narrowband band reflection filters which individually reflect only light with a different specific wavelength, for example.

In this case, the wavelengths to be reflected on the individual optical film filters 31 to 37 (or 61 to 67) are set independent to the sequence of the reflection. This narrowband band reflection filter is realized by a rugate filter (a notch filter) where the mixture ratio of two materials with a different refraction index changes at a cycle of a half of a wavelength.

While the examples where the wavelength dispersion slope of the optical fiber, namely the second-order wavelength component, is compensated are described in the embodiment and the individual variations, the present invention is not limited to them, and it is possible to compensate a third or higher order wavelength dispersion depending on the design of the multi-faced mirror 11 (50) since the multi-faced mirror 11 (50) provides a different wavelength dispersion for a different channel signal wavelength.

While the several preferred embodiments of the present invention are described above, the present invention is not limited to them, and a person skilled in the art can apply the present invention while making various changes in the scope defined in these aspects and the equivalence of these aspects based on the principle of the present invention.

What is claimed is:

1. A wavelength dispersion generation apparatus comprising:
   a virtually imaged phased array (VIPA) generator which receives input light having a respective wavelength within a continuous range of wavelengths and causes multiple reflections of the input light that splits the input light into a plurality of light beams, which produces self-interference of the input light that forms an output light, wherein the output light is spatially distinguishable from an output light formed on input light having any other wavelength within the continuous range of wavelengths;
   a lens which focuses the output light emitted from said VIPA; and
   a mirror which reflects the incident light from said lens to return the incident light to said lens,
   wherein said mirror comprises a multi-faced mirror having multiple reflection surfaces with different shapes in a traveling direction of the incident light from said lens, each of said reflection surfaces reflecting the incident light according to the wavelengths comprising the incident light.

2. The wavelength dispersion generation apparatus according to claim 1, wherein each of said reflection surfaces has a curved surface shape with a different curvature in the traveling direction of the incident light from said lens.

3. The wavelength dispersion generation apparatus according to claim 2, wherein each of said reflection surfaces comprises an optical film filter having a different transmission wavelength characteristic and a different reflection wavelength characteristic.

4. The wavelength dispersion generation apparatus according to claim 3, wherein each of said optical film filters is a broadband band-pass filter or a long wave pass filter having a characteristic of reflecting light with a specific wavelength, and transmitting light with a wavelength longer than the specific wavelength, with the optical film filter closest to an input side of the light from said lens having the shortest specific wavelength.

5. The wavelength dispersion generation apparatus according to claim 3, wherein each of said optical film filters is a broadband band-pass filter or a short wave pass filter having a characteristic of reflecting light with a specific wavelength, and transmitting light with a wavelength shorter than the specific wavelength, with the optical film filter closest to an input side of the light from said lens having the longest specific wavelength.

6. The wavelength dispersion generation apparatus according to claim 3, wherein each of said optical film filters is a narrowband band reflection filter having a characteristic of reflecting light with a different specific wavelength, and transmitting light with a wavelength other than the specific wavelength.

7. The wavelength dispersion generation apparatus according to claim 3, wherein said multi-faced mirror has multiple resin layers, each resin layer comprising an ultraviolet curing resin having a light transmission characteristic in the continuous range of wavelengths, and said optical film filters are respectively formed on a surface of said resin layers.

8. The wavelength dispersion generation apparatus according to claim 1, wherein each of said reflection surfaces comprises an optical film filter having a different transmission wavelength characteristic and a different reflection wavelength characteristic.

9. The wavelength dispersion generation apparatus according to claim 8, wherein each of said optical film filters is a broadband band-pass filter or a long wave pass filter having a characteristic of reflecting light with a specific wavelength, and transmitting light with a wavelength longer than the specific wavelength, with the optical film filter closest to an input side of the light from said lens having the shortest specific wavelength.

10. The wavelength dispersion generation apparatus according to claim 8, wherein each of said optical film filters is a broadband band-pass filter or a short wave pass filter having a characteristic of reflecting light with a specific wavelength, and transmitting light with a wavelength shorter than the specific wavelength, with the optical film filter closest to an input side of the light from said lens having the longest specific wavelength.

11. The wavelength dispersion generation apparatus according to claim 8, wherein each of said optical film filters is a narrowband band reflection filter having a characteristic of reflecting light with a different specific wavelength, and transmitting light with a wavelength other than the specific wavelength.

12. The wavelength dispersion generation apparatus according to claim 8, wherein said multi-faced mirror has multiple resin layers, each resin layer comprising an ultraviolet curing resin having a light transmission characteristic in a wavelength band including said multiple types of wavelengths, and said optical film filters are respectively formed on a surface of said resin layers.

13. A mirror unit used in a wavelength dispersion generation apparatus that generates wavelength dispersion, said mirror unit comprising:

a multi-faced mirror receiving different wavelengths of input light at respective positions thereon, the input light incident upon the mirror having been split into individual portions according to wavelength, each individual portion of the split light traveling in a different direction according to wavelength, said mirror having a plurality of reflection surfaces with different shapes, each of the reflection surfaces respectively reflecting the individual portions of the split light according to wavelength.

14. The multi-faced mirror used for a wavelength dispersion generation apparatus according to claim 13, wherein each of said reflection surfaces has a curved surface shape with a different curvature in the traveling direction of said input light.

15. The multi-faced mirror used for a wavelength dispersion generation apparatus according to claim 14, wherein each of said reflection surfaces comprises an optical film filter having a different transmission wavelength characteristic and a different reflection wavelength characteristic.

16. A mirror unit used in a wavelength dispersion generation apparatus that generates wavelength dispersion, said mirror unit comprising:

a multi-faced mirror receiving different wavelengths of input light at respective positions thereon, the input light incident upon the mirror having been split into individual portions according to wavelength, each individual portion of the split light traveling in a different direction according to wavelength, wherein said mirror has a plurality of reflection surfaces with different shapes, each of the reflection surfaces respectively reflecting the individual portions of the split light according to wavelength, each of said reflection surfaces has a curved surface shape with a different curvature in the traveling direction of said input light, each of said reflection surfaces comprises an optical film filter having a different transmission wavelength characteristic and a different reflection wavelength characteristic, and each of said optical film filters is a broadband band-pass filter or a long wave pass filter having a characteristic of reflecting light with a specific wavelength, and transmitting light with a wavelength longer than the specific wavelength, with the optical film filter closest to an input side of the light from said lens having the shortest specific wavelength.

17. A mirror unit used in a wavelength dispersion generation apparatus that generates wavelength dispersion, said mirror unit comprising:

a multi-faced mirror receiving different wavelengths of input light at respective positions thereon, the input light incident upon the mirror having been split into individual portions according to wavelength, each individual portion of the split light traveling in a different direction according to wavelength, wherein said mirror has a plurality of reflection surfaces with different shapes, each of the reflection surfaces respectively reflecting the individual portions of the split light according to wavelength, each of said reflection surfaces has a curved surface shape with a different curvature in the traveling direction of said input light, each of said reflection surfaces comprises an optical film filter having a different transmission wavelength characteristic and a different reflection wavelength characteristic, and each of said optical film filters is a broadband band-pass filter or a short wave pass filter having a characteristic of reflecting light with a specific wavelength, and transmitting light with a wavelength shorter than the specific wavelength, with the optical film filter closest to an input side of the light from said lens having the longest specific wavelength.

18. The multi-faced mirror used for a wavelength dispersion generation apparatus according to claim 15, wherein each of said optical film filters is a narrowband band reflection filter having a characteristic of reflecting light with a different specific wavelength, and transmitting light with a wavelength other than the specific wavelength.

19. The multi-faced mirror used for a wavelength dispersion generation apparatus according to claim 15, wherein said multi-faced mirror has multiple resin layers, each resin layer comprising an ultraviolet curing resin having a light transmission characteristic in a wavelength band including said multiple types of wavelengths, and said optical film filters are respectively formed on a surface of said resin layers.

20. The multi-faced mirror used for a wavelength dispersion generation apparatus according to claim 13, wherein each of said reflection surfaces comprises an optical film filter having a different transmission wavelength characteristic and a different reflection wavelength characteristic.

21. A mirror unit used in a wavelength dispersion generation apparatus that generates wavelength dispersion, said mirror unit comprising:

a multi-faced mirror receiving different wavelengths of input light at respective positions thereon, the input light incident upon the mirror having been split into individual portions according to wavelength, each individual portion of the split light traveling in a different direction according to wavelength, wherein said mirror has a plurality of reflection surfaces with different shapes, each of the reflection surfaces respectively reflecting the individual portions of the split light according to wavelength, each of said reflection surfaces comprises an optical film filter having a different transmission wavelength characteristic and a different reflection wavelength characteristic, and each of said optical film filters is a broadband band-pass filter or a long wave pass filter having a characteristic of reflecting light with a specific wavelength, and transmitting light with a wavelength longer than the specific wavelength, with the optical film filter closest to an input side of the light from said lens having the shortest specific wavelength.

22. A mirror unit used in a wavelength dispersion generation apparatus that generates wavelength dispersion, said mirror unit comprising:

a multi-faced mirror receiving different wavelengths of input light at respective positions thereon, the input light incident upon the mirror having been split into individual portions according to wavelength, each individual portion of the split light traveling in a different direction according to wavelength, wherein said mirror has a plurality of reflection surfaces with different shapes, each of the reflection surfaces respectively reflecting the individual portions of the split light according to wavelength, each of said reflection surfaces comprises an optical film filter having a different transmission wavelength characteristic and a different reflection wavelength characteristic, and each of said optical film filters is a broadband band-pass filter or a short wave pass filter having a characteristic of reflecting light with a specific wavelength, and transmitting light with a wavelength shorter than the specific wavelength, with the optical film filter closest to an input side of the light from said lens having the longest specific wavelength.

23. The multi-faced mirror used for a wavelength dispersion generation apparatus according to claim 20, wherein each of said optical film filters is a narrowband band reflection filter having a characteristic of reflecting light with a different specific wavelength, and transmitting light with a wavelength other than the specific wavelength.

24. The multi-faced mirror used for a wavelength dispersion generation apparatus according to claim 20, wherein said multi-faced mirror has multiple resin layers, each resin layer comprising an ultraviolet curing resin having a light transmission characteristic in a wavelength band including said multiple types of wavelengths, and said optical film filters are respectively formed on a surface of said resin layers.

25. A method of manufacturing a multi-faced mirror, comprising:

a first step of applying a first ultraviolet curing resin with a light transmission characteristic on a plate;

a second step of press-contacting a first die having a first sectional shape with the first ultraviolet curing resin, and irradiating with ultraviolet light to harden the first ultraviolet curing resin;

a third step of separating the first die from the first ultraviolet curing resin;

a fourth step of forming a first optical film filter, which is a first reflection surface, having a first transmission wavelength and a first reflection wavelength on the first ultraviolet curing resin;

a fifth step of applying a second ultraviolet curing resin with a light transmission characteristic on the first optical film filter;

a sixth step of press-contacting a second die having a second sectional shape different from the first sectional shape with the second ultraviolet curing resin, and irradiating with ultraviolet light to harden the second ultraviolet curing resin;

a seventh step of separating the second die from the second ultraviolet curing resin; and an eighth step of forming a second optical film filter, which is a second reflection surface having a second transmission wavelength and a second reflection wavelength different from the first transmission wavelength and the second reflection wavelength on the second ultraviolet curing resin, wherein the first optical film filter and the second optical film filter are formed as a broadband band-pass filter or a long wave pass filter having a characteristic of reflecting light with a specific wavelength and transmitting light with a wavelength longer than the specific wavelength, with the first optical film filter, which is closer to an input side of the mirror, having the shorter specific wavelength.

26. The manufacturing method of a multi-faced mirror according to claim 25, wherein the second optical film filter is formed as a filter corresponding to the first optical film filter, and the fifth to eighth steps are repeated to form multiple reflection surfaces.

* * * * *